United States Patent
Matsunaga

(10) Patent No.: US 11,763,389 B2
(45) Date of Patent: Sep. 19, 2023

(54) APPLICATION, A SERVICE PROCESSING SYSTEM AND AN INSURANCE SERVICE PROCESSING SYSTEM USING THE SAME

(71) Applicant: Chikara Matsunaga, Kobe (JP)

(72) Inventor: Chikara Matsunaga, Kobe (JP)

(73) Assignee: Chikara Matsunaga, Hyogo (JP)

( * ) Notice: Subject to any disclaimer, the term of this patent is extended or adjusted under 35 U.S.C. 154(b) by 46 days.

(21) Appl. No.: 16/311,094

(22) PCT Filed: Apr. 21, 2017

(86) PCT No.: PCT/JP2017/016068
§ 371 (c)(1),
(2) Date: Dec. 18, 2018

(87) PCT Pub. No.: WO2018/193624
PCT Pub. Date: Oct. 25, 2018

(65) Prior Publication Data
US 2020/0211119 A1    Jul. 2, 2020

(51) Int. Cl.
*G06Q 40/08* (2012.01)
*G06F 21/31* (2013.01)

(52) U.S. Cl.
CPC ............. *G06Q 40/08* (2013.01); *G06F 21/31* (2013.01)

(58) Field of Classification Search
None
See application file for complete search history.

(56) References Cited

U.S. PATENT DOCUMENTS 5,751,287 A * 5/1998 Hahn ................ G06F 3/0481
715/775
6,166,716 A    12/2000 Kashino
(Continued)

FOREIGN PATENT DOCUMENTS

JP      11-195033 A     7/1999
JP    2006-277193 A    10/2006
(Continued)

OTHER PUBLICATIONS

Turn your iPad/iPhone into a mobile office; MicaRed introduces OverTheAir version 1.3, features dropbox support, an ability to open files in other applications...*
(Continued)

*Primary Examiner* — Kito R Robinson
(74) *Attorney, Agent, or Firm* — Hamre, Schumann, Mueller & Larson, P.C.

(57) ABSTRACT

[Problem to be solved] To provide an application for setting a security for verifying the input contents and operation contents when not only opening an application file but also closing the application file.
[Solution] An application available in a computer system comprises; an application file which includes an open secret code for opening each application file by the application and a close secret code for closing each application file normally by the application; an application file open program module for opening the application file under the condition that the input code is match with the open secret code; an application file close program module for closing the application file as normally under the condition that the input code is matched with the close secret code.

12 Claims, 16 Drawing Sheets

(56) References Cited

U.S. PATENT DOCUMENTS

| | | | |
|---|---|---|---|
| 2003/0115085 A1* | 6/2003 | Satoh | G06Q 10/103 705/5 |
| 2005/0204130 A1* | 9/2005 | Harris | G06F 21/10 713/165 |
| 2007/0192871 A1* | 8/2007 | Kamekawa | G06F 21/6209 726/26 |
| 2009/0204434 A1* | 8/2009 | Breazeale, Jr. | H04L 12/1886 705/2 |
| 2010/0082368 A1 | 4/2010 | Gecelter et al. | |
| 2011/0221568 A1 | 9/2011 | Giobbi | |
| 2012/0278228 A1* | 11/2012 | Rubinstein | G07F 17/0092 221/6 |
| 2012/0284298 A1* | 11/2012 | Mason | G16Z 99/00 707/769 |
| 2013/0152219 A1* | 6/2013 | Yang | G06F 21/36 726/30 |
| 2014/0172443 A1 | 6/2014 | Long | |
| 2015/0033807 A1* | 2/2015 | Yang | G05B 15/00 70/14 |
| 2018/0121843 A1* | 5/2018 | Connely, IV | H04W 12/02 |

FOREIGN PATENT DOCUMENTS

| | | |
|---|---|---|
| JP | 2007-207036 A | 8/2007 |
| JP | 2008-191955 A | 8/2008 |

OTHER PUBLICATIONS

*U CONTINUED*...and passcode lock. (Aug. 30, 2010). Business Wire Retrieved from https://dialog.proquest.com/professional/docview/1066249559?accountid=131444 on Apr. 13, 2023 (Year: 2010).*

International Search Report and Written Opinion, International Patent Application No. PCT/JP2017/016068, dated Aug. 1, 2017, with English translation of search report (8 pages).

Anonymous: "How to Get Excel to Prompt When Opened for Read or Write | Chron.com", Dec. 30, 2016 (Dec. 30, 2016), pp. 1-2, XP055971803, Retrieved from the Internet: URL:https://web.archive.org/web/20161230205609/https://smallbusiness.chron.com/excel-prompt-opened-read-write-48685.html [retrieved on Oct. 17, 2022].

Office Action issued for the European Patent Application No. 17906500.8, dated Oct. 25, 2022, 8 pages.

* cited by examiner

APPLICATION, A SERVICE PROCESSING SYSTEM AND AN INSURANCE SERVICE PROCESSING SYSTEM USING THE SAME

TECHNICAL FIELD

This invention relates to an application processed on a computer system. Especially, this invention relates to an application processing with security by the normal operation in which it is opened, used and closed in a normal state. The use of the application is not limited, and it can be employed for various uses in various technical fields.

This invention relates to a computer system using the abovementioned application. The use of the computer system is not limited, and can be employed for various uses in various technical fields. For example, the computer system using the application can be employed in an insurance service processing system for assisting service to a patient by a service provider such as medical operation, medical treatment, nursing care, therapy treatment, long-term life care and rehabilitation treatment, and for enhancing the security for ensuring that these services were taken actually and correctly.

In the insurance service processing system in this specification, the service includes various care and treatment provided in such a medical operation, medical treatment, nursing care, therapy treatment, long-term life care and rehabilitation treatment, various medicine prescriptions and various training machine usage. A service provider is a person who provides service covered by the insurance and obtains a fee. For example, a doctor, a nurse, a dentist, a dental hygienist, a rubbing massage finger pressure therapist, a chiropractor, an acupuncturist, a judo-orthopaedist, a health care worker and a physical therapist are included as a service provider. The present insurance service processing system can be employed both in a system for the hospital visiting style and in a system for the home visiting style. In addition, the present insurance service processing system can assist insurance claim processing.

BACKGROUND ART

In a computer system, various applications are processing, and various security measures are introduced for ensuring the security. There are various security measures. For example, a well-known security measure requests the input of the secret code information such as a password at the beginning operation of the application file to open. By this password security, the right person who has authority to access the application file used in the application can access and open the application file. For example, password input is requested by keyboard. For example, both password input and identification code information input from the IC card are requested. For example, both password input and biological information such as finger print and vein pattern from user are requested according to the security level. Furthermore, application file can be opened on the condition that several authority persons' secret code information is input independently and identified successfully. A single person's secret code information is not enough to open the application file.

As shown above, the conventional application that has high level security to open the application file for operation is known in the prior art.

Once the application and application file are opened to be operated, the user can use application and data input and data editing via the application. During the application processing, another password or identification information input may be requested independently if user would like to start to use another special function beyond currently given authority.

Such conventional security measures for opening the application file and starting the special function beyond currently given authority are known in the prior art. However, there is no special security measure for closing the application file after use of the application nor ending the use of the special function in the prior art. There is no example for employing the security measure for requesting input password nor identification code information. The conventional application is simply request pushing or touching the command button such as "End button" and "Close button" or inputting the end command via keyboard.

FIG. 15 is a schematic view showing the operation of the general application for starting and opening the application file, using, then closing. It is an example showing the typical operation for opening and closing the application file.

As shown in FIG. 15(a), application 10 is installed to the computer system. When the user starts to use the application 10, the user selects the icon of the application 10 displaying onto the monitor by the pointing device such as mouse. With the user input application file open command by the double click operation, the application 10 is started.

In this case, several application files such as 20a, 20b, 20c that can be operated by the application 10 are installed to the computer system, and the corresponding icons are displayed on the monitor. The user selects the icon of the application file 20 by the pointing device such as a mouse and conducts the double click operation, and the selected application file 20 is opened by the application 10. The application file 20 is opened by the application 10 to be operable, and current data contents are displayed onto the monitor.

If the application file 20 has a security measure for requesting password input, a password input column pops-up for confirming the use authority as shown in the upper figure of FIG. 15(b). As shown above, password input may be requested if the user starts application 10 and opens application file 20 for operating in the prior art. If higher security is combined, the input of the identification information from IC card and the input of the biological information are requested besides the password input.

As shown in the upper figure of FIG. 15(b), if the user inputs requested password and code information for opening the application file 20 via keyboard or other input devices, and the authentication process is identified successfully to fulfill the requested security level, the application file 20 is opened normally.

Next, as shown in the lower figure of FIG. 15(b), when the user finishes the desired operation through the application file 20, the user can simply close the application file 20 by pushing the command button or the pull-down menu such as "End button" and "Close button" by the pointing device such as mouse. The application 10 and the application file 20 are simply finished and closed normally.

The conventional application 10 does not request any input for special password and ID information when closing the application file 20. The conventional application 10 finishes simply and closes the application file 20 simply.

As shown above, when accessing the application file 20, various information input is requested according to the employed security level for confirming the authentication of the user at the opening of the application file 20. However, once the authentication check is conducted at the opening event, it is assumed that the right person who satisfied authentication keeps on using under his authentication, and the finishing operation and closing operation of the application file 20 is conducted under his authentication. Therefore, the conventional application 10 does not request any special input of the password and ID information at the closing operation of the application file 20. Of course, there is a possibility that the application 10 and application file 20 faces a forced termination abnormally by becoming inoperable state by some operation error or system error. However, when the operation reaches to the end normally without any operation error nor system error, the application 10 can be simply finished and the application file 20 can be simply closed in the prior art.

Recently, the applications and application files connected via the network and service processing systems that are organized by plural computer systems via network are well spread in addition to the conventional stand-alone type computer system. However, the operation and processing for starting the application 10, opening the application file 20, use and finishing the application 10 and closing the application file 20 are the same those of the stand-alone computer system as shown above. The network system requests the security for inputting code information such as password and ID information when the user logging-in the network system and opening the application file 20 via the network. However, the conventional network system does not request the security for inputting any code information such as password and ID information when logging-off the network system and closing the application file 20 via the network. The user can simply close the conventional application file 20 via the conventional network system.

The above-mentioned processing is explained with specific example.

FIG. 16 is a schematic view showing the conventional insurance service processing system as an example of the service processing system using the application.

First, the services to be processed by the conventional insurance service processing system are explained including the well-used word.

Under the Japanese health insurance system and the Japanese national health insurance system, the medical service fees, medical expense fees and the long-term life care fees are predetermined according to each "medical content", "nurse case content", "dental treatment content" and "operation content" in the available service menu in the medical operation, medical treatment, nursing care, therapy treatment, long-term life care and rehabilitation treatment. The insurance fee claimer makes an appropriate insurance fee bill (it is called a "receipt") and claims insurance fee to the insurer (The National Health Insurance Society of the municipalities, the mutual aid associations, the health insurance societies and the long-term life care society) based on the receipt under the predetermined rule and procedure. The insurer examines the receipt, if the claimed receipt is correct, medical service fees, medical expense fees and the long-term life care fees are paid to the insurance fee claimer.

For example, the medical service fee is predetermined according to each medical operation such as diagnosis, medical operation, medicine administration and medical examination. The medical clinic claims appropriate insurance fees to the insurer (The National Health Insurance Society of the municipalities, the mutual aid associations, the health insurance societies and the long-term life care society) based on the receipt under the predetermined rule and procedure for the medical fee claiming.

For example, the medical expense fee is predetermined according to each therapy operation for the bonesetter clinic, the acupuncture clinic and the rubbing massage finger pressure therapy clinic. These medical expense clinics claim appropriate insurance fee from the insurer based on the medical expense payment application under the predetermined rule and procedure for the medical expense payment claiming.

For example, long-term care fee is predetermined according to each professional care and the life assistance service menu to the insured person for the long-term care facilities. The long-term care facilities claim appropriate the long-term care fee to the insurer based on the benefit application based on the long-term care planning under the predetermined rule and procedure for the long-term care fee claiming.

The receipt data is the data showing the content of the provided service in the insurance fee bill. The receipt is an insurance fee bill for claiming the insurance payment such as the medical fee, the medical expense fee and the long-term payment fee. According to the present practice, the receipt for the medical service fee is pre-examined by the receipt examination institution (Federation of National Health Insurance Associations, Social Insurance Medical Fee Payment Fund). After examination, the receipt is submitted to the insurer. In the medical expense fee case, the receipt can be submitted to the insurer directly.

Hereinafter, the claiming procedure for the case of the medical service fee is explained. The insurance fee claiming procedure is basically the same both for the clinic visiting style (the insured patient visits the service provider such as a clinic who will be the insurance fee claimer) and for the home visiting style (the service provider staff belonging to the service provider who will be the insurance fee claimer visits the insured at patient home) except for the service place and the service routine. The insurance fee claiming procedure is basically the same as that of medical service fee, medical expense fee and the long-term payment fee except for the service content.

As an example, the general insurance fee claiming procedure for the medical expense fee by a judo-orthopaedist of the clinic visiting style case is shown below.

FIG. 16 is a schematic view showing the conventional general insurance fee claiming procedure, general examination procedure and the general payment procedure for the medical expense fee by a judo-orthopaedist of the bone setter clinic visiting style case. As shown in FIG. 16, it is explained by the three-way model of "Patient A", "Bonesetter clinic B" and "Insurer D".

"Patient A" shows the insurance certification to the "Bonesetter clinic B". "Bonesetter clinic B" makes a medical treatment plan based on the interview sheet after the judo-orthopaedist interviews to the "Patient A". The medical expense payment application is required for the medical expense payment for the case of the medical treatment such as bone fracture treatment and sprain treatment. Basically, the signature by the "Patient A" is required in the receipt (medical expense payment application). However, it is difficult for the "Patient A" to sign the receipt (medical expense payment application) at the submitting timing to the "Insurer D" because of the difference of timing when "Bonesetter clinic B" makes and submits the receipt (medical expense payment application) and when "Patient A" visits "Bonesetter clinic B". Therefore, in the actual practice, "Bonesetter clinic B" requires "Patient A" to sign the blank receipt (medical expense payment application) with a carte blanche at the first visit to the "Bonesetter clinic B".

The "Bonesetter clinic B" makes a receipt (medical expense payment application) and submits the receipt (medical expense payment application) to the "Insurer D" (The National Health Insurance Society of the municipalities, the mutual aid associations, the health insurance societies and the long-term life care society) directly. The "Insurer D" examines the receipt (medical expense payment application) and pays the medical expense fee to the "Bonesetter clinic B" according to the receipt (medical expense payment application).

As shown in FIG. 16, the medical expense fee payment is conducted by the receipt making processing based on the medical treatment in the "Bonesetter clinic B", the receipt submitting processing by the "Bonesetter clinic B", the examining processing of the "Insurer D" and the payment procedure from the "Insurer D" to the "Bonesetter clinic B".

The application for the bonesetter clinic for inputting data is required to make the receipt corresponding to the medical treatment. Not only data inputting function but also receipt making function are required to the application for the bonesetter clinic.

The operation shown in FIG. 15 is applied below.

When the judo-orthopaedist of the bonesetter clinic starts medical treatment service to the "Patient A" by using the application 10 for the bonesetter clinic, he selects the icon of the application file 20 of the "Patient A" displayed onto the monitor of the computer system by the double click of the pointing device such as a mouse or by his finger touching a touch panel installed to the computer system. For example, a password input column is popped-up. The judo-orthopaedist can input correct password if he has authentication. If the correct password is input, his authentication is certified and the application file 20 can be operated by the application 10. If the security level is higher, the ID information input via the IC card or the biological information input such as finger print or vein pattern may be required besides the password.

Prior art 1: JP 2006-277193

DISCLOSURE OF THE INVENTION

The Problems to be Solved

If the person who opens the application file has an authentication and passes the authentication check process and the input content and operation content to the application file are in his authentication range, it is no problem for the application and the application file to be finished and closed without any special condition. Therefore, there is no conventional application 10 requesting any special security measure such as password input to user for closing the application file 20.

However, there should be some cases to verify the updated data after editing the input content and operation content at the finishing the application 10 and closing the application file 20.

Errors in the input content and operation content can occur by the user's misinput or misunderstanding. In some cases, the user intentionally inputs incorrect data and operates incorrect content. If the wrong data different from the correct data are edited in the application file 20 and such wrong data is fixed and stored as a result of the data input and operation via the application 10, it causes problem. Also, if the wrong edited application file 20 is sent to other systems via the network, it causes problem.

It is possible to check and verify that the input content and operation content in the application file 20 edited by the application 10 are correct and without error or not by checking and verifying the result data in the application file 20 after finishing the application 10.

However, it is useful for suppressing the possibility of fixing and storing wrong data by the error input and wrong operation by user's misinput or user misunderstanding if the closing condition for the application file 20 is set to verify that the input content and operation content is correct without error by himself at the ending timing of the application file 20. With this closing condition, the possibility of the edited data at closing the application file 20 becomes higher because the user or checker verifies and approves edited data carefully.

This is very useful for various service processing system, there are many applicable service processing systems to set such security measures at the application file closing phase in various technical field.

For example, there is the insurance service processing assistance system. In case of the conventional insurance service processing system as shown in FIG. 16, the judo-orthopaedist makes receipt data by operating the application running in the "Bonesetter clinic B" by himself and processing the insurance claiming operation by himself. Therefore, inappropriate claiming of the medical expense fee by the excess claiming occurred by the judo-orthopaedist's unintentional misinput and false claiming by judo-orthopaedist's intentional padded claiming become big problems. The excess claiming that occurred by judo-orthopaedist's unintentional misinput can be protected by checking the suitability between the medical treatment content and the medical expense fee and by re-calculating the medical expense fee. However, it may difficult to protect the judo-orthopaedist's intentional padded claiming.

In order to achieve the above-mentioned object, the present invention provides an application and the service processing system for checking and verifying the input content and operation content are correct and without error at not only opening the application file but also closing the application file and suppressing the error input and wrong operation by user's misinput or user misunderstanding and suppressing the user's unintentional misinput and false claiming. For example, the present invention provides the insurance service processing system which employs the present application and the present service processing system.

Means for Solving the Problems

In order to achieve the above-mentioned object, the application of the present invention comprises an application file that includes an open secret code for opening the application file and a close secret code for closing the application file; an application file open program module that matches the input code with the open secret code, and opens the application file under the condition that the input code is matched with the open secret code; an application file close program module that matches the input code with the close secret code, and closes the application file under the condition that the input code is matched with the close secret code.

By this configuration, the present application can check and verify the correctness of the edited data, input content and operation content by setting the security measure not only by the open secret code at the opening of the application file but also by the close secret code at the closing of the application file.

In this configuration, if the holder of the open secret code and the holder of the close secret code are the different person, the security level becomes higher. If the authenticated person who can open the application file by the application file open program module by inputting the open secret code and the authenticated person who can close the application file by the application file close program module by inputting the close secret code are different, the present application can verify the correctness of the edited data, input content and operation content at a higher level. Especially, the authenticated person who can close the application file by inputting the close secret code is the service beneficiary, the service beneficiary can check and verity the correctness between the edited data in the application file and the actual service content provided by the service provider.

To enhance the security for the application processing, the application file further includes a select secret code for selecting an application file among the application files that are available in the computer system and a deselect secret code for deselecting the application file which is closed normally by the application file close program module besides the open secret code and the close secret code. The application further comprises an application file select program module that selects the application file under the condition that the input code is matched with the select secret code; and an application file deselect program module that deselects the application file which is closed normally by the application file close program module under the condition that the input code is matched with the deselect secret code.

By this configuration, the application can set the security measure in each of the following phases, the application file select phase for selecting the target application, the application file open phase for opening the target application, the application file close phase for closing the edited application, and the application deselect phase for deselecting the closed application file. Each secret code corresponding to each phase is required, and higher security level can be achieved. The security measure setting is not limited to setting at every phase. The security measure setting can be controlled arbitrarily. For example, the secret code input is required in the two phases that the application file open phase and the application file close phase. For example, the secret code input is required in the three phases of the application file select phase, the application file open phase and the application file close phase.

There are various service processing systems that can employ the present application. The use of the service processing system is not limited, the service processing system can be applied to various uses in various technical fields. The present application comprises a service processing program module besides the abovementioned application file open program module and the abovementioned application file close program module, the present application can cover various service processing according to the service processing program. The service processing module becomes available under the condition that the application file becomes available by the application file open program module. The service processing module is ended corresponding to the close processing of the application file by the application file close program module or the service processing module is ended before the close processing of the application file independently.

For example, the present service processing system can be applied as the insurance service processing system, wherein the visitor is the service provider and the person visited by the visitor is the service beneficiary, and the insurance service processing system is a service provider visiting assisting system.

For example, the open secret code is input as the combination of the numeral and alphabet, and the close secret code is input as another combination of numeral and alphabet.

For example, the open secret code is input as a first service provider ID information for identifying the service provider, and the close secret code is input as a first service beneficiary ID information for identifying the service beneficiary.

The first service provider ID information can be an information recorded in a service provider IC card carried by the service provider, or a biological information of the service provider. As an input device, a keyboard, card reader and a biological information input device can be provided according to the content of the first service provider ID information.

The first service beneficiary ID information can be an information recorded in a service beneficiary IC card carried by the service beneficiary, or a biological information of the service beneficiary. As an input device, a keyboard, card reader and a biological information input device can be provided according to the content of the first service beneficiary ID information.

The insurance service processing system of the present invention can include a secret code controller. The secret code controller controls that the first service provider ID information is used as the open secret code to the application file open program module, and the first service beneficiary ID information is used as the close secret code to the application file close program module.

If the application file includes a select secret code and a deselect secret code, the select secret code is input as the combination of the numeral and alphabet, and the deselect secret code is input as another combination of numeral and alphabet.

For example, the select secret code is input as a second service provider ID information for identifying the service provider, and the deselect secret code is input as a second service beneficiary ID information for identifying the service beneficiary.

The second service provider ID information can be an information recorded in a service provider IC card carried by the service provider, or a biological information of the service provider. As an input device, a keyboard, card reader and a biological information input device can be provided according to the content of the second service provider ID information.

The second service beneficiary ID information can be an information recorded in a service provider IC card carried by the service beneficiary, or a biological information of the service beneficiary. The second service beneficiary ID information can be the address information of the service beneficiary. As an input device, a keyboard, card reader and a biological information input device can be provided according to the content of the second service beneficiary ID information. Furthermore, if the second service beneficiary ID information is the address information of the service beneficiary, GPS information can be applicable. A receiver of the GPS information from GPS system can be utilized in this case. Furthermore, the combination of a beacon device installed to the beneficiary home for providing the address information and a beacon receiver installed to the service provider computer can be applicable. Furthermore, the combination of a wireless IC tag installed to the beneficiary home for providing the address information and a wireless IC signal receiver installed to the service provider computer can be applicable. Furthermore, the combination of an ultrasonic wave transmitter installed to the beneficiary home for providing the address information and an ultrasonic wave receiver installed to the service provider computer can be applicable.

The insurance service processing system of the present invention can comprise a secret code controller that controls the former input of the second service beneficiary ID information is used as the select secret code to the application file select program modules, the first service provider ID information is used as the open secret code to the application file open program module, the first service beneficiary ID information is used as the close secret code to the application file close program module, and the latter input of the second service beneficiary ID information is used as the deselect secret code to the application file deselect program module.

There are several patterns of the relationship between the service provider and the service beneficiary. If the visitor is the service provider and the person visited by the visitor is the service beneficiary, the insurance service processing system becomes a service provider visiting assisting system. If the visitor is the service beneficiary and the person visited by the visitor is the service provider, the insurance service processing system becomes an outpatient visiting assisting system.

In case of the service provider visiting assisting system, the service provider who utilize the service provider visiting assisting system of the present invention carries the service provider computer installing the application of the present invention and visits to the service beneficiary's home and provides the requested services. The service provider operates the application file, edits and inputs the data via the application installed in the service provider computer. During the operation, each requested secret code should be input in each of the application file select phase, the application file open phase, the application file close phase and the application file deselect phase.

In case of the outpatient visiting assisting system, the service provider who utilizes the service provider visiting assisting system of the present invention holds the service provider computer installing the application of the present invention and provides the requested services to the service provider who visits to the service provider clinic. The service provider operates the application file, edits and inputs the data via the application installed in the service provider computer. During the operation, the requested each secret code should be input in each of the application file select phase, the application file open phase, the application file close phase and the application file deselect phase.

BRIEF DESCRIPTION OF THE DRAWINGS

FIG. 13 is a schematic view showing an example of a receipt made by the insurance service processing system 200.

FIG. 14 is a schematic view showing an example of a treatment sheet.

DETAILED DESCRIPTION OF THE PREFERRED EMBODIMENT

Some embodiments of an application, service processing system and an insurance service processing system according to the present invention are described below with reference to the relevant drawing. Needless to add, the claims of the present invention include but are not limited to the application, configuration, or quantity shown in the following embodiments.

Hereinafter, the example of the application and the basic operation of the application of the present invention are described in Embodiment 1 and 2. Embodiment 1 is an example in which the open secret code and the close secret code are applied. Embodiment 2 is an example in which the select secret code, the open secret code, the close secret code and the deselect code are applied.

The example of the service providing assisting system as the service processing system employing the application of the present invention are described in Embodiment 3 and 4. Embodiment 3 is an example that the open secret code and the close secret code are applied. Embodiment 4 is an example in which the select secret code, the open secret code, the close secret code and the deselect code are applied.

Embodiment 5 shows an example of the insurance service processing system applied as a service provider visiting assisting system employing the service processing system and the application of the present invention.

Embodiment 6 shows an example of the insurance service processing system applied as an outpatient visiting assisting system employing the service processing system and the application of the present invention.

Embodiment 7 shows an example of the insurance service processing system applied as a long-term care outpatient visiting assisting system employing the service processing system and the application of the present invention.

Embodiment 1

The application of the present invention of Embodiment 1 is described.

Figure 1:
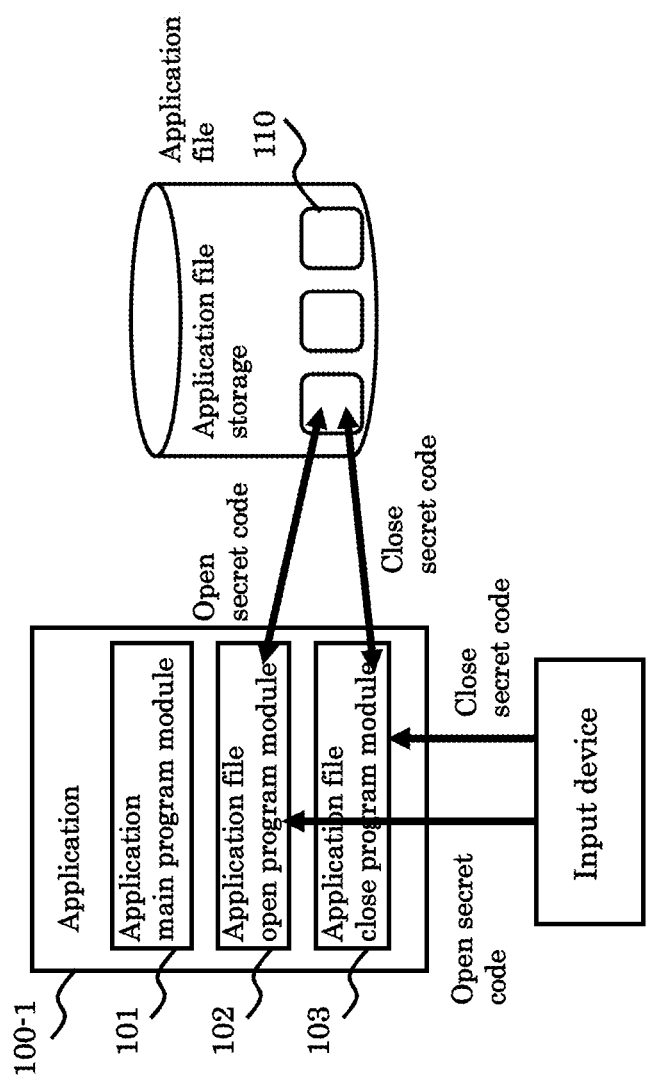
FIG. 1 is a schematic view of the structure of the application 100-1 of Embodiment 1.

FIG. 1 is a schematic view of the structure of the application 100-1 of Embodiment 1. In each application file 110 used by the application 100-1, an open secret code for opening each application file 110 by the application 100-1 and a close secret code for closing each application file 110 normally by the application 100-1 have been set in advance.

As shown in FIG. 1, application 100-1 comprises an application main program module 101, an application file open program module 102 and an application file close program module 103.

The application main program modules 101 are various functions depending on the application 100-1. If the application 100-1 is a service processing application, a variety of functions for executing the required service processing are equipped as the application main program modules. General basic functions such as the data input function, the data output function and data storing function are included as the application main function.

Figure 2:
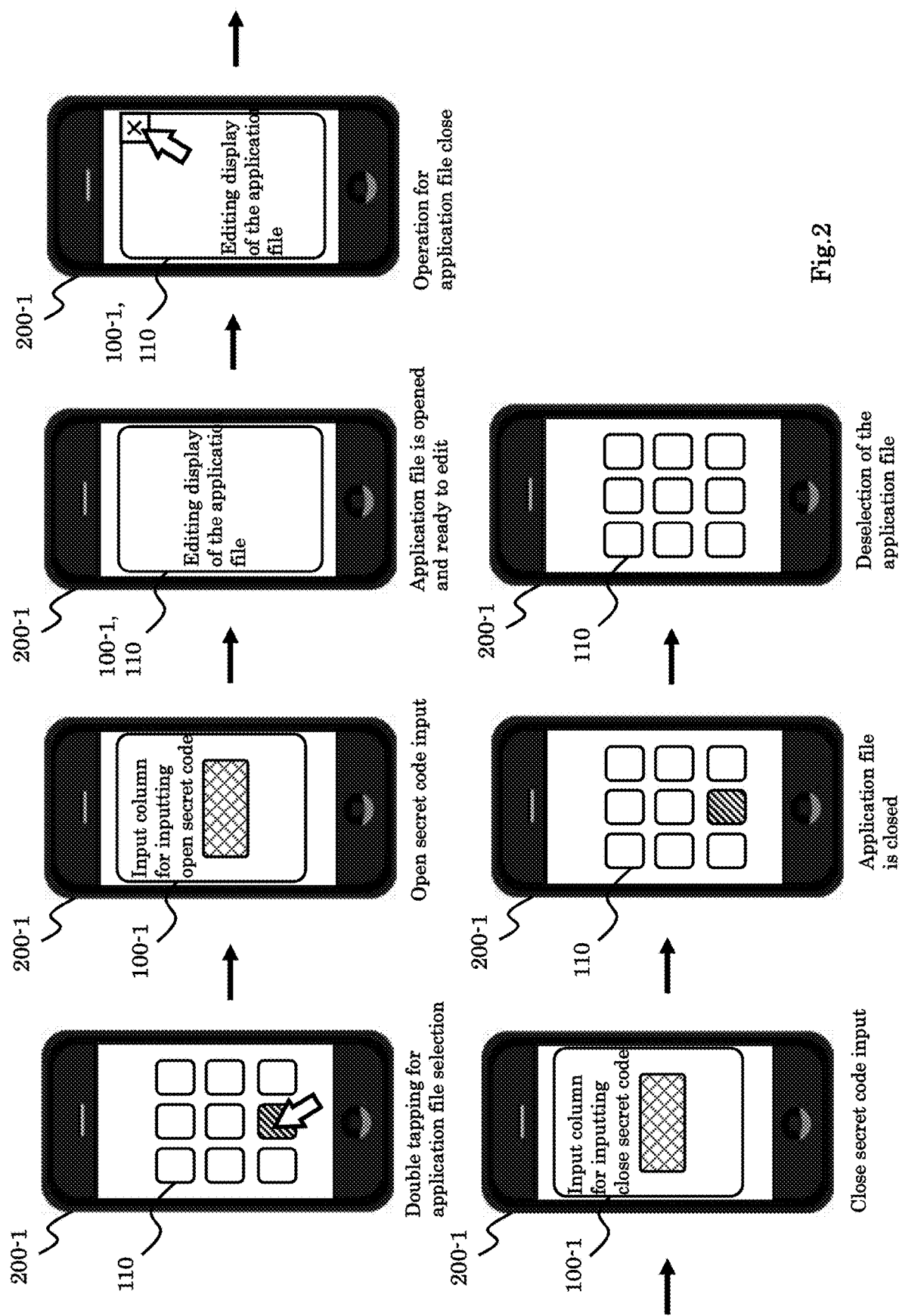
FIG. 2 is a schematic view showing the basic operation flow of the application 100-1 of the present invention.

The application file open program module 102 is a program that that matches the input code via the input device with the open secret code, and opens the application file under the condition that the input code is matched with the open secret code The application file close program module 103 is a program that that matches the input code via the input device with the close secret code, and closes the open state application file as normally under the condition that the input code is matched with the close secret code FIG. 2 is a schematic view showing the basic operation flow of the application 100-1 of the present invention. Especially, it is focusing on the security processes which are set in the application file open phase and the application file close phase.

In this example, application 100-1 is installed in a smart phone and the user can input data by the touch input device via the smart phone display.

The application 100-1 of the present invention is software, the use of the software is not limited. The application file 110 is a data set that can be treated, edited and operated by the application 100-1 of the present invention.

The graphic user interface can display the existence of the application file with a corresponding icon. In the operation of the conventional general application file, if the icon is selected by the mouse, the corresponding application for treating the application file is activated automatically and the application file is opened automatically by the application. As a result, the application file becomes ready to be operated via the application.

In this Embodiment 1, the icon-based graphic user interface is employed. Therefore, each icon corresponding to each application file 110 which can be operated by the application 100-1 is displayed on the smart phone display.

An example of the operation flow of the application 100-1 of Embodiment 1 is described below.

The user selects the application file 110 (Step S101).

The operation for selecting the target application file 110 is not limited. As an example, the icon corresponding to the target application file 110 is double tapped, and the target application file 110 is selected automatically.

An input column for inputting "the open secret code" for opening the application file 110 is a pop-up and is displayed on the display. The input of the open secret code is required (Step S102).

The method for inputting the open secret code is not limited. As an example, the open secret code is input to the input column by touch input via the touch key displayed on the display.

If the open secret code is input (Step S103) and verified (Step S104: Y), the application 100-1 is activated, the target application file 110 is opened and the target application file 110 becomes the operable state to be edited and operated via the application 100-1 (Step S105).

The user edits and operates the application file 110 via the application 100-1, and then the editing and operating of the application file 110 is completed (Step S106).

The user finishes editing the application file 110 and operates for closing the application file 110 (Step S107).

In this case, the user specifies the closing operation for the application file 110 by tapping "Close", which is one of the operation bottoms displayed on the graphical user interface of the application 100-1.

An input column for inputting "the close secret code" for closing the application file 110 is a pops-up and is displayed on the display. The input of the close secret code is required (Step S108).

The method for inputting the close secret code is not limited. As an example, the close secret code is input to the input column by touch input via the touch key displayed on the display.

If the close secret code is input (Step S109) and verified (Step S110: Y), the application file 110 is closed (Step S111). The edited data and operation content are fixed.

Embodiment 2

The application 100-2 of the present invention of Embodiment 2 is described below.

The application 100-2 of Embodiment 2 is an example in which the select secret code, the open secret code, the close secret code and the deselect code are applied. Regarding the elements that are the same as those of Embodiment 1, descriptions for those are omitted below.

Figure 3:
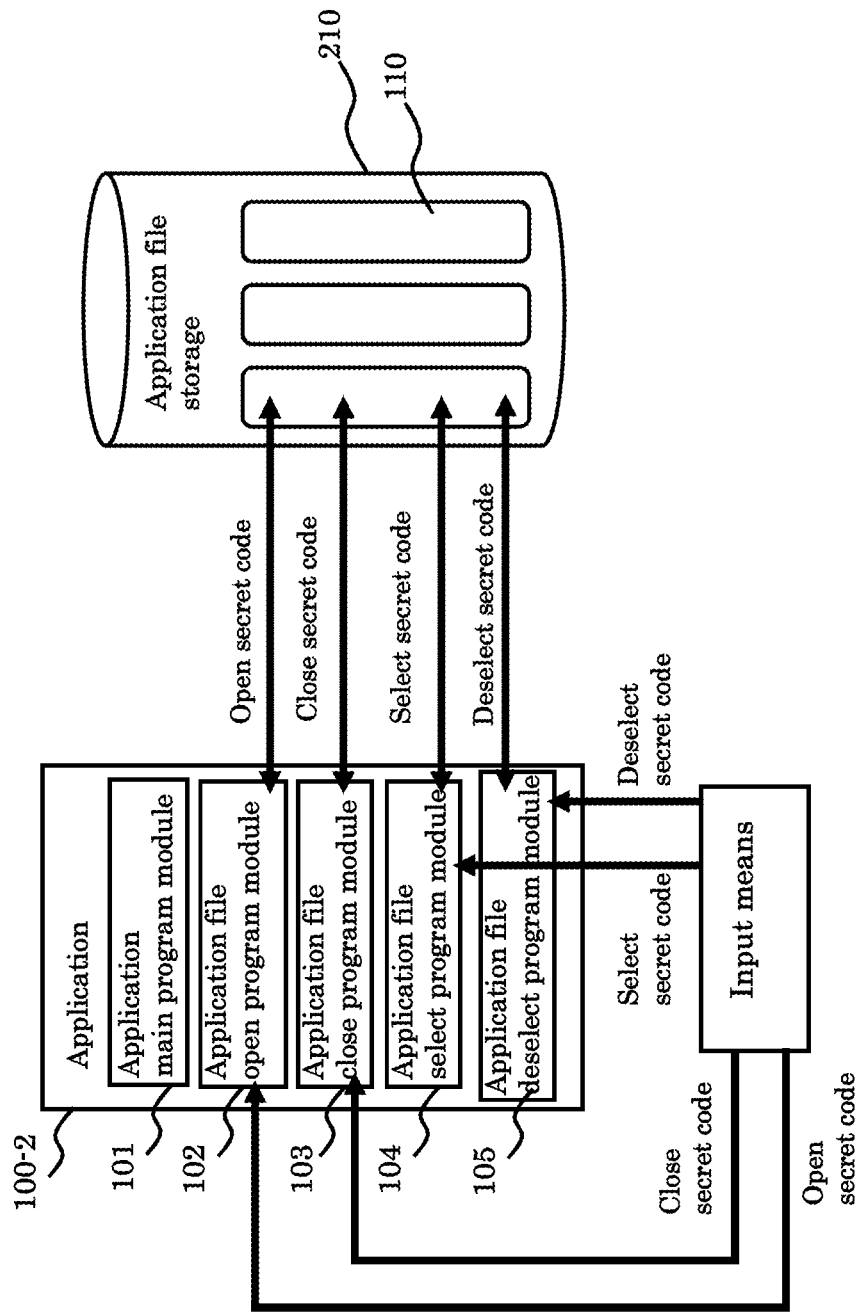
FIG. 3 is a schematic view of the structure of the application 100-2 of Embodiment 2.

FIG. 3 is a schematic view of the structure of the application 100-2 of Embodiment 2. In each application file 110 used by the application 100-2, a select secret code for selecting each application file 110 by the application 100-2, an open secret code for opening each application file 110 by the application 100-2, a close secret code for closing each application file 110 normally by the application 100-2 and a deselect secret code for deselecting each application file 110 by the application 100-2 have been set in advance.

As shown in FIG. 3, application 100-2 comprises an application main program module 101, an application file open program module 102, an application file close program module 103, an application file select program modules 104 and an application file deselect program module 105.

The application main program modules 101 are various program modules depending on the application 100-2. If the application 100-2 is a service processing application, a variety of functions for executing the required service processing are equipped as the application main program modules. General basic functions such as the data input function, the data output function and data storing function are included as the application main program modules.

The application file open program module 102 is the same as that shown in Embodiment 1. The application file open program module 102 is a program module that that matches the input code via the input device with the open secret code, and opens the application file under the condition that the input code is matched with the open secret code.

The application file close program module 103 is the same as that shown in Embodiment 1. The application file close program module 103 is a program module that matches the input code via the input device with the close secret code, and closes the application file under the condition that the input code is matched with the close secret code.

The application file select program modules 104 is a program module that selects the application file under the condition that the input code via the input device is matched with the select secret code. In the initial state, no application file is selected. First, an application file should be selected for executing somewhat operation to the application file. The present invention of Embodiment 2 requires verification by the select secret code for selecting the application file. The security measure is set in the application file select phase.

The application file deselect program module 105 is a program module that deselects the application file which is closed normally by the application file close program module under the condition that the input code is matched with the deselect secret code. After editing and operating the target application file, the application file is still activated and selected. If somewhat operation is executed, the operation is reflected on the still selected application file. Therefore, the currently selected application file should be deselected, and another application file should be reselected if the user demands other operation to the reselected another application file. The present invention of Embodiment 2 requires verification by the deselect secret code for deselecting the current application file. The security measure is set in the application file deselect phase.

Figure 4:
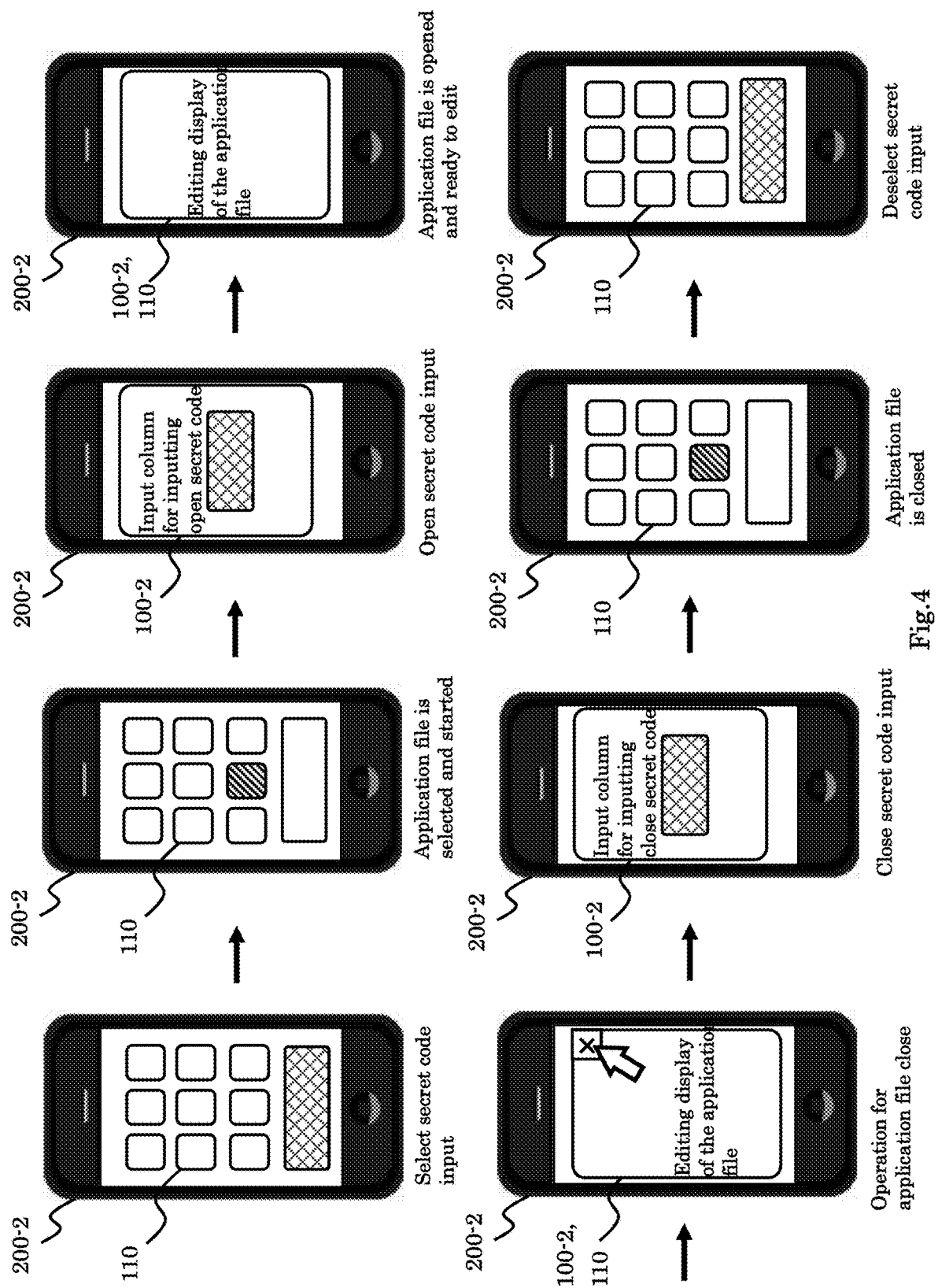
FIG. 4 is a schematic view showing the basic operation flow of the application 100-2 of the present invention.

FIG. 4 is a schematic view showing the basic operation flow of the application 100-2 of the present invention. Especially, it is focusing on the security processes that are set in the application file select phase, the application file open phase, the application file close phase and the application file deselect phase.

In this example, application 100-2 is installed in a smart phone and the user can input data by the touch input device via the smart phone display.

The same as Embodiment 1, the application 100-2 of the present invention is software, and the use of the software is not limited. The application file 110 is a data set that can be treated, edited and operated by the application 100-2 of the present invention.

An example of the operation flow of the application 100-2 of Embodiment 2 is described below.

The user selects the application file 110 (Step S201).

The operation for selecting the target application file 110 is not limited. As an example, the icon corresponding to the target application file 110 is double tapped and, the target application file 110 is selected automatically.

An input column for inputting "the select secret code" for selecting the application file 110 is a pop-up and is displayed on the display. The input of the select secret code is required (Step S202).

The method for inputting the select secret code is not limited. As an example, the select secret code is input to the input column by touch input via the touch key displayed on the display.

If the select secret code is input (Step S203) and verified (Step S204: Y), the application file 110 becomes a selected state.

Next, an input column for inputting "the open secret code" for opening the application file 110 is a pop-up and is displayed on the display. The input of the open secret code is required (Step S206).

If the open secret code is input (Step S207) and verified (Step S208: Y), the application 100-2 is activated and the application file 110 is opened and becomes an operable state to be edited and operated via the application 100-2 (Step S209).

The user edits and operates the application file 110 via the application 100-2, and then the editing and operating of the application file 110 is completed (Step S220).

The user finishes the editing of the application file 110 and operates for closing the application file 110 (Step S221).

An input column for inputting "the close secret code" for closing the application file 110 is pop-up and displayed on the display. The input of the close secret code is required (Step S222).

If the close secret code is input (Step S223) and verified (Step S224: Y), the application file 110 is closed (Step S225). The edited data and operation content are fixed.

Next, the user deselects the application file 110 (Step S226).

An input column for inputting "the deselect secret code" for deselecting the application file 110 is a pop-up and is displayed on the display. The input of the deselect secret code is required (Step S227).

The method for inputting the deselect secret code is not limited. As an example, the deselect secret code is input to the input column by touch input via the touch key displayed on the display.

If the deselect secret code is input (Step S228) and verified (Step S229: Y), the application file 110 becomes deselected state (Step S230). Another application file 110 can be selected on demand after this deselecting the currently selected application file110.

Embodiment 3

The service providing system 200-1 of the present invention of Embodiment 3 is described below. The service providing system 200-1 is an example of the service processing system of the present invention utilizing the application file in which the open secret code and the close secret code are set. Regarding the elements that are the same as those of Embodiment 1, descriptions for those are omitted below.

Figure 5:
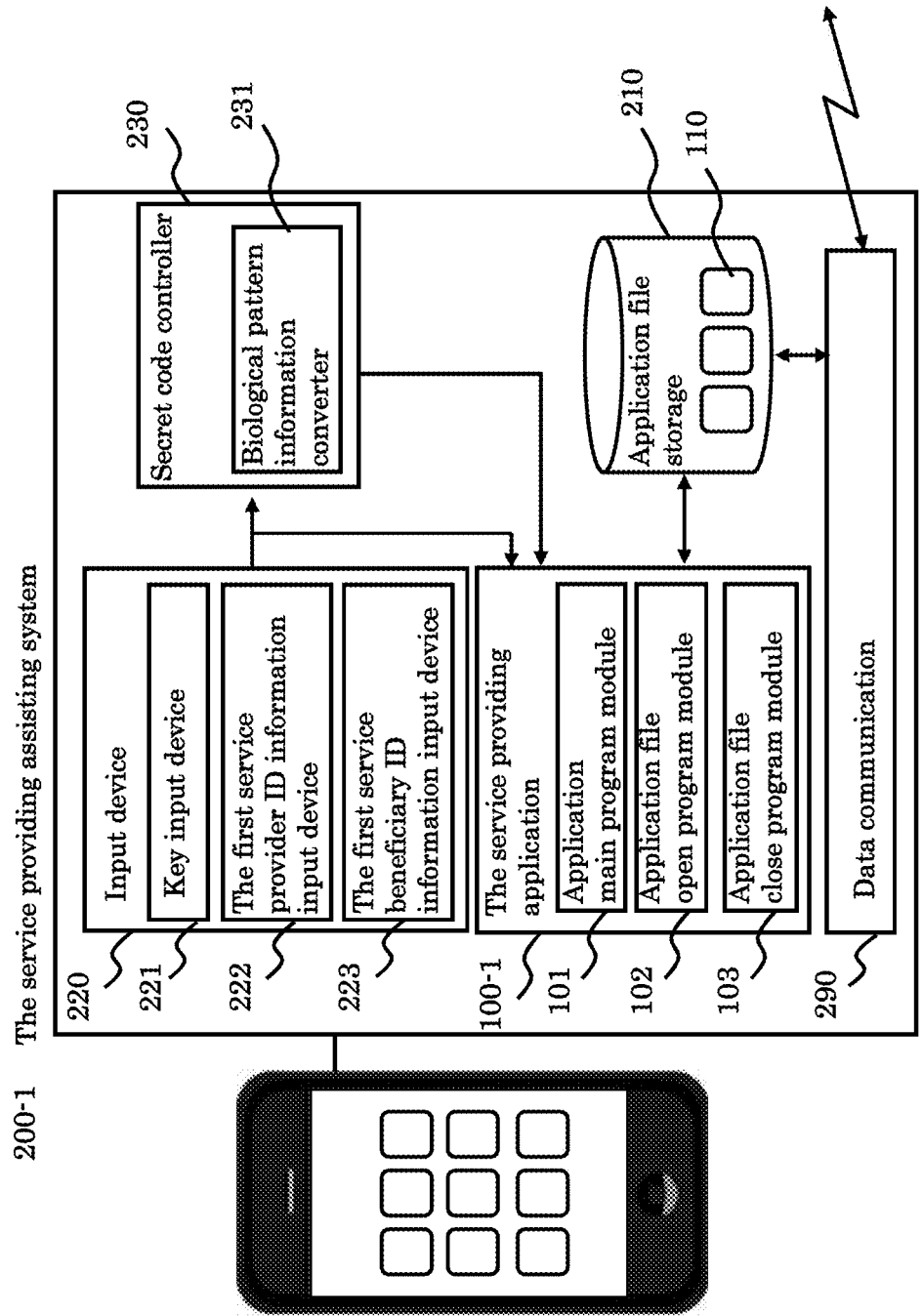
FIG. 5 is a schematic view showing configuration of the service providing assisting system 200-1 as an example of the service processing system.

FIG. 5 is a schematic view showing the configuration of the service providing assisting system 200-1 as an example of the service processing system.

As shown in FIG. 5, the service providing assisting system 200-1 comprises a service providing application 100-1, an application file 110, an application file storage 210, an input device 220, secret code controller 230 and a network system 290.

The service providing application 100-1 is software, the same as that shown in Embodiment 1, which comprises a main program modules 101, an application file open program module 102, and an application file close program module 103.

The application file 110 is a data set, the same as that shown in Embodiment 1, which can be treated, edited and operated by the service providing application 100-1 of the present invention. In this example, the application file 110 is stored in the application file storage 210.

The application file storage 210 is a storage device storing the application file 110 and the application file storage 210 is configured as accessible by the service providing application 100-1.

The input device 220 is a data input device equipped with the system. For example, the input device 220 outputs the input data to the secret code controller 230.

A various input device such as IC card reader, biological information reader in addition to general input device such as a keyboard, a touch panel can be employed as the input device 220. The input device 220 can be selected according to the system operation.

A key input device 221 is a general input device such as keyboard and touch panel. If the secret code is a combination of numeral and alphabet and the user can the input secret code directly, this key input device 221 can be utilized. In this case, the secret code controller 230 outputs the input code information via the key input device 221 to the application file open program module 102 or the application file close program module 103 in the service providing application as it is.

The first service provider ID information input device 222 is a device for receiving the first service provider ID information for identifying the service provider. As first service provider ID information input device 222, various devices can be employed.

If the first service provider ID information is an information recorded in a service provider IC card carried by the service provider, the IC card reader can be employed as the first service provider ID information input device 222. If the first service provider ID information is a biological information of the service provider, the biological information reader (such as a finger print pattern reader, vein pattern reader, iris pattern reader and speech pattern) can be employed as the first service provider ID information input device 222.

The first service beneficiary ID information input device 223 is a device for receiving the first service beneficiary ID information for identifying the service beneficiary.

As the first service beneficiary ID information input device 223, various devices can be employed. If the first service beneficiary ID information is an information recorded in a service provider IC card carried by the service beneficiary, the IC card reader can be employed as the first service beneficiary ID information input device 223. If the first service beneficiary ID information is a biological information of the service beneficiary, the biological information reader (such as a finger print pattern reader, vein pattern reader, iris pattern reader and speech pattern) can be employed as the first service beneficiary ID information input device 223.

The secret code controller 230 is an element for receiving the input data via the input device 220 and for outputting data to the service providing application 100-1. If it is necessary for data to convert from the input information to the secret code which is available in the service providing application 100-1, the secret code controller 230 converts the input data to the secret code.

The secret code controller 230 includes a biological pattern information converter 231. The biological pattern information converter 231 can extract the feature points from the scanned biological image data such as the finger print pattern, the vein pattern, the iris pattern and the speech pattern, and converts the feature points to the code data by executing the predetermined calculation and conversion processing based on the extracted feature points. The predetermined calculation and conversion processing can be employed in the biological pattern information converter 231 if these are matched with the process of the service providing application 100-1. It is enough for predetermined calculation and conversion processing if the biological pattern information input by the correct service provider and the correct service beneficiary can be converted to the correct secret code required in the correct application file 110.

If the secret code is a combination of numeric and alphabetic elements and the user inputs secret code directly via the key input device 221, the secret code controller 230 outputs the input code to the service providing application 100-1 as it is.

If the first service provider ID information input device 222 is the biological pattern information reader, the input data will be the pattern information (image data) such as the finger print pattern, the vein pattern, the iris pattern and the speech pattern. The secret code controller 230 employs the biological pattern information converter 231 to convert the input pattern information (image data) to the code data (alpha-numeric data). The secret code controller 230 outputs the converted data to the application file open program module 102 or the application file close program module 103 of the service providing application 100-1 as the open secret code or the close secret code.

An example of the operation flow of the service providing system 200-1 of Embodiment 3 is described below.

The Selection of the Application File 110 (Step S301)

The user selects the target application file 110.

The Operation for Opening the Application File 110 (Step S302)

The user executes the opening operation.

The Request for Inputting the Open Secret Code (Step S303)

The input of the open secret code is required by the service providing system 200-1 corresponding to the user request for using the service provided by the application file 110 via the service providing application 100-1.

The Input of the Open Secret Code (Step S304)

The user inputs the open secret code via either of the key input device 221, the first service provider ID information input device 222 and the first service beneficiary ID information input device 223 equipped in the input device 220. If the open secret code is input as the alpha-numeric code to the input device 220 via the key input device 221, the input device 220 outputs the open secret code to the application file open program module 102 as it is. If the open secret code is input by the biological pattern information to the input device 220, the secret code controller 230 converts the input biological pattern information to the open secret code via the biological pattern information converter 231, and outputs the converted secret code to the application file open program module 102.

The Verifying the Open Secret Code (Step S305)

If the input open secret code is verified with the set open secret code in the application file 110, the service providing application 100-1 is activated, the target application file 110 is opened and the target application file 110 becomes the operable state to be edited and operated via the service providing application 100-1.

The Service Providing (Step S306)

The user edits and operates the application file 110 via the application 100-1, and then the editing and operating of the application file 110 is completed.

The End of Services (Step S307)

If the operation is finished, the user starts the ending operation of the application file 110.

The Operation for Closing (Step S308)

The user executes the ending operation of the application file 110.

The Input of the Close Secret Code (Step S309)

The service provider who executes the closing operation, inputs the close secret code via either of the key input device 221, the first service provider ID information input device 222 and the first service beneficiary ID information input device 223 equipped in the input device 220. If the close secret code is input as the alpha-numeric code, the input device 220 outputs the input close secret code to the application file close program module 103 as it is. If the close secret code is input by the biological pattern information, the secret code controller 230 converts the input biological pattern information to the open secret code via the biological pattern information converter 231, and outputs the converted secret code to the application file close program module 103.

The Fixation of the Edited Content to the Application File 110 (Step S310)

The application file 110 is closed as normally, and the edited content of the application file 110 is fixed.

In the above-described operation, it is possible to differentiate the input device between the open secret code input phase and the close secret code input phase. For example, the first service provider ID information is used as the open secret code via the first service provider ID information input device 222 in the open secret code input phase, and the first service beneficiary ID information is used as the close secret code via the first service beneficiary ID information input device 223 in the close secret code input phase. In this case, both the service provider ID information and the service beneficiary ID information are requested for the security measure, it satisfies higher security level.

Embodiment 4

The service providing system 200-2 of the present invention of Embodiment 4 is described below. The service providing system 200-2 is an example of the service processing system of the present invention utilizing the application file in which the open secret code, the close secret code, the select secret code and the deselect code are set. Regarding the elements that are the same as those of former Embodiment, the descriptions for those are omitted below.

Figure 6:
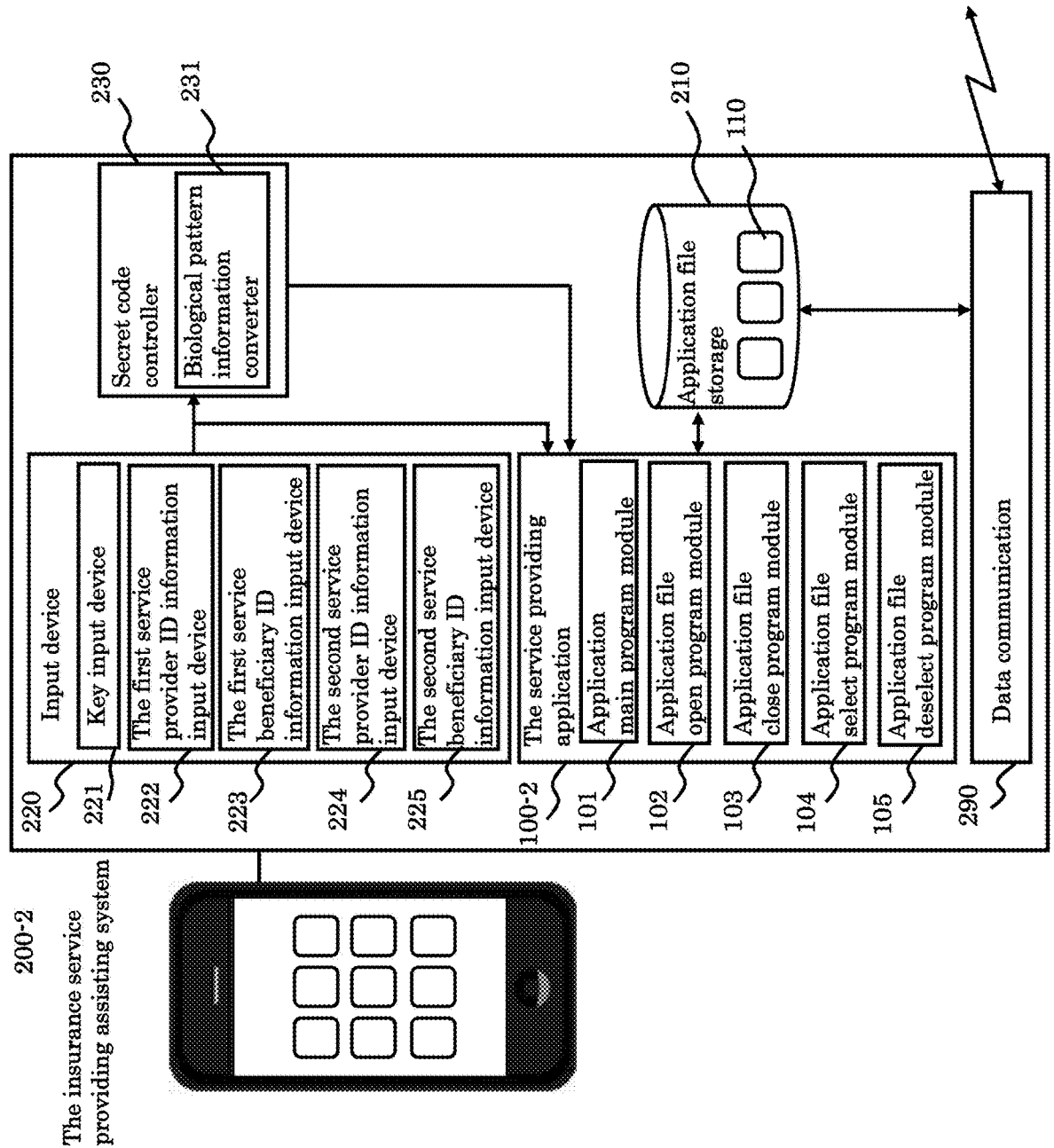
FIG. 6 is a schematic view showing configuration of the service providing assisting system 200-2 as another example of the service processing system.

FIG. 6 is a schematic view showing configuration of the service providing assisting system 200-2 as an example of the service processing system.

As shown in FIG. 6, the service providing assisting system 200-2 comprises a service providing application 100-2, an application file 110, an application file storage 210, an input device 220, secret code controller 230 and a network system 290.

The service providing application 100-2 is software, the same as that shown in Embodiment 2, which comprises a main program modules 101, an application file open program module 102, an application file close program module 103, an application select program module 104 and an application deselect program module 105. The elements are the same as the service providing application 100-2 shown in Embodiment 2.

The application file 110 is data set, the same as that shown in Embodiment 2, which can be treated, edited and operated by the service providing application 100-2 of the present invention.

The application file storage 210 is the same as shown in Embodiment 3.

The input device 220 is a data input device equipped with the system. For example, the input device 220 outputs the input data to the secret code controller 230.

The same as Embodiment 3, a various input device such as IC card reader, biological information reader in addition to general input device such as a keyboard, a touch panel can be employed as the input device 220. The input device 220 can be selected according to the system operation.

Among the element of the input device 220, key input device 221, the first service provider ID information input device 222 and the first service beneficiary ID information input device 223 are the same as those of Embodiment 3. There are the second service provider ID information input device 224 and the second service beneficiary ID information input device 225 as the available elements of input device 220.

The second service provider ID information input device 224 is a device for receiving the second service provider ID information for identifying the service provider who utilizes the service providing assisting system 200-2. The second service provider ID information input device 224 may be the different device from the first service provider ID information input device 222. For example, if the first service provider ID information input device 222 is an IC card reader, the second service provider ID information input device 224 may be a biological information reader.

The second service beneficiary ID information input device 225 is a device for receiving the second service beneficiary ID information for identifying the service beneficiary (the person who receives the service by the service provider). The second service beneficiary ID information input device 225 may be the different device from the first service beneficiary ID information input device 223. For example, the holder of the second service beneficiary ID information input device 225 may be the service beneficiary. The second service beneficiary ID information input device 225 can sends the second service beneficiary ID information associated with the personal information of the service beneficiary or the address information of the service beneficiary to the service provider computer. For example, the second service beneficiary ID information associated with the address information of the service beneficiary are input from a wireless IC tag installed to the beneficiary home for providing the address information. Another example, a beacon device installed to the beneficiary home for providing the address information can be available. Another example, an ultrasonic wave transmitter installed to the beneficiary home for providing the address information and an ultrasonic wave receiver installed to the service provider computer can be applicable. If GPS information is employed, the second service beneficiary ID information input device 225 may be the GPS signal receiver.

The same as Embodiment 3, the secret code controller 230 receives and converts the input data via the input device 220 to the secret code and outputs the converted secret code to the application 100-2. The secret code controller 230 can employ the biological pattern information converter 231 as shown in Embodiment 3.

An example of the operation flow of the service providing system 200-2 of Embodiment 4 is described below.

The Selection of the Application File 110 (Step S401)

The user selects the target application file 110 which is the data set regarding the user. For example, the user inputs the second service beneficiary ID information via the second service beneficiary ID information input device 225 and it is output to the application file select program modules 104 as the select secret code.

The Verification of the Select Secret Code (Step S402)

If the input select secret code is verified with the select secret code in the application file 110, the identified application 110 is selected normally.

The Operation for Opening the Application File 110 (Step S403)

The user executes the opening operation for the selected application file.

The Request for Inputting the Open Secret Code (Step S404)

The input of the open secret code is required by the service providing system 200-2 corresponding to the specified application file 110.

The Input of the Open Secret Code (Step S405)

The user inputs open secret code via either of the key input device 221 or the first service provider ID information input device 222 equipped in the input device 220. If the open secret code is input as the alpha-numeric code to the input device 220 via the key input device 221, the input device 220 outputs the input open secret code to the application file open program module 102 as it is. If the open secret code is input by the biological pattern information to the input device 220, the secret code controller 230 converts the input biological pattern information to the open secret code via the biological pattern information converter 231, and outputs the converted secret code to the application file open program module 102.

The Verifying the Open Secret Code (Step S406)

If the input open secret code is verified with the set open secret code in the application file 110, the service providing application 100-2 is activated, the target application file 110 is opened and the target application file 110 becomes the operable state to be edited and operated via the service providing application 100-2.

The Service Providing (Step S407)

The user edits and operates the application file 110 via the application 100-2, and then the editing and operating of the application file 110 is completed.

The End of Services (Step S408)

If the operation is finished, the user starts the ending operation of the application file 110.

The Operation for Closing (Step S409)

The user executes the ending operation of the application file 110.

The Input of the Close Secret Code (Step S410)

The service provider who executes the closing operation inputs the close secret code via either of the key input device 221 and the first service beneficiary ID information input device 223 equipped in the input device 220. If the close secret code is input as the alpha-numeric code, the input device 220 outputs the open secret code to the application file close program module 103 as it is. If the open secret code is input by the biological pattern information, the secret code controller 230 converts the input biological pattern information to the open secret code via the biological pattern information converter 231, and outputs the converted secret code to the application file close program module 103.

The Fixation of the Edited Content to the Application File 110 (Step S411)

The application file 110 is closed as normally, and the edited content of the application file 110 is fixed.

The Input of the Deselect Secret Code (Step S412)

The user deselects the target application file 110 after ending the application file 110. For example, the user re-inputs the second service beneficiary ID information via the second service beneficiary ID information input device 225 and it is output to the application file deselect program module 105 as the deselect secret code.

The Verification of the Deselect Secret Code (Step S413)

If the input the deselect secret code is verified with the deselect secret code in the application file 110, the identified application 110 is deselected normally.

Embodiment 5

Embodiment 5 shows an example of the insurance service processing system applied as a service provider visiting assisting system employing the service processing system and the application of the present invention.

Hereinafter, an insurance fee claimer is a person or a clinic who claims insurance fee to the insurer. For example, there are a medical clinic, a dental clinic, a pharmacy, a judo-orthopaedist clinic, a health care worker clinic and a physical therapist clinic and so on. For example, regarding a long-term care fee claimer, there are a long-term care facility, a health care worker clinic and a physical therapist clinic and so on. Embodiment 5 shows an example of the insurance service processing system which is used by the insurance fee claimer for claiming an appropriate insurance fee to the insurer. Especially, the insurance service processing system is enhanced for the factoring processing.

In this embodiment, the judo-orthopaedist clinic is used as a generic name for a judo-orthopaedist clinic, a bonesetter clinic, an acupuncture clinic and a rubbing massage finger pressure therapy clinic who can claim medical expense fee for insurer.

For example, the insurer is one of those of "The National Health Insurance Society of the municipalities", "The mutual aid associations", "The health insurance societies" and "The long-term life care society". The insurance beneficiary is a person who has a benefit from at least one of the insurers.

For example, the financial institute is used as a generic name for a bank, a credit association, a non-bank entity such as a credit card company and a fund.

The insurance service processing system 200-2A of Embodiment 5 is the same type of the service providing system 200-2 shown in Embodiment 4.

Figure 7:
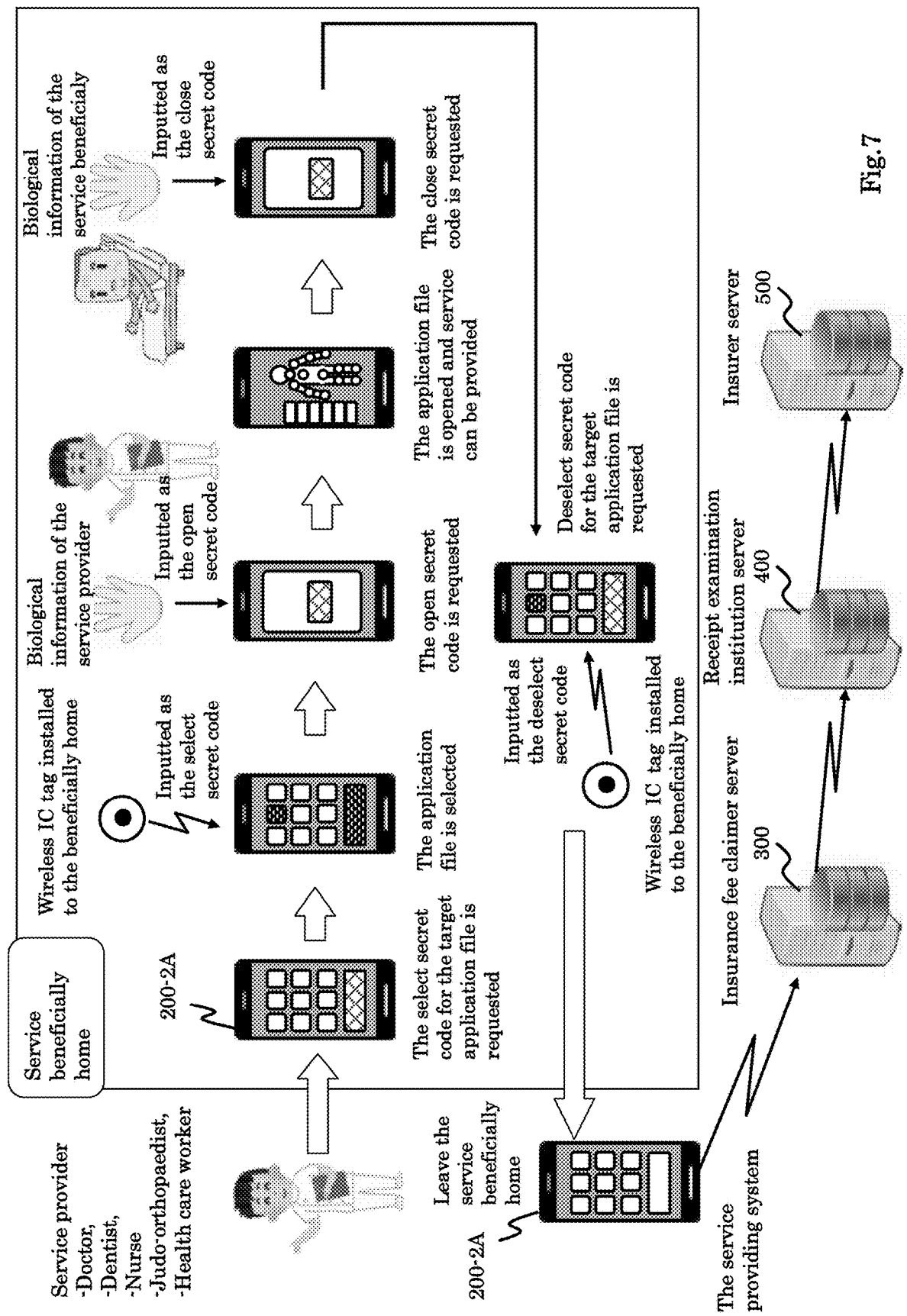
FIG. 7 is a schematic view of the basic operation flow and the basic processes of the insurance service processing system 200-2A as the service provider visiting assisting system.

FIG. 7 is a schematic view of the basic operation flow and the basic processes of the insurance service processing system 200-2A as the service provider visiting assisting system.

Figure 8:
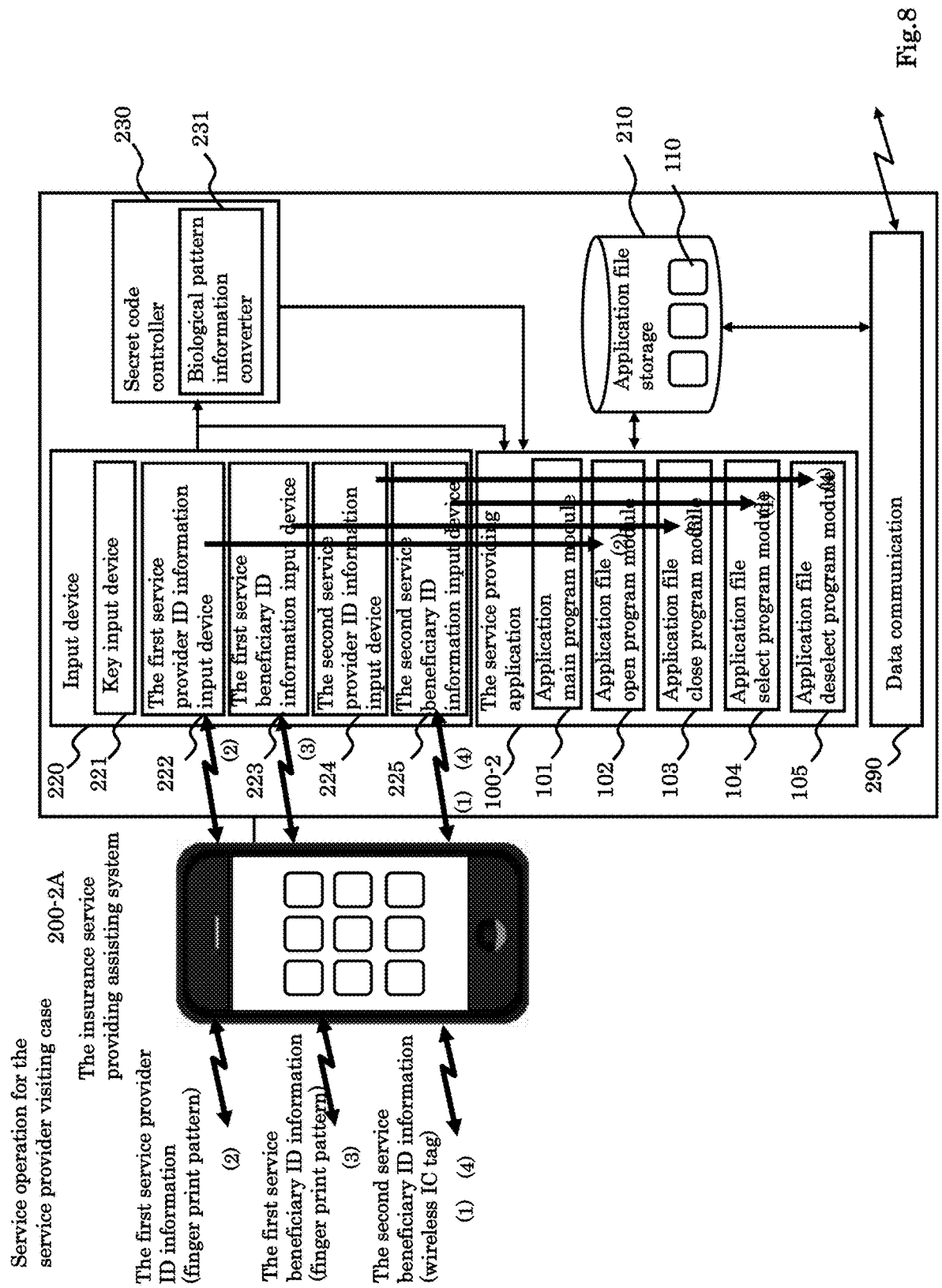
FIG. 8 is a schematic view showing examples of select secret code, open secret code, close secret code and deselect secret code input to the insurance service processing system 200-2A.

FIG. 8 is a schematic view showing examples of select secret code, open secret code, close secret code and deselect secret code input to the insurance service processing system 200-2A.

The insurance service processing system 200-2A as the service provider visiting assisting system shown in FIG. 7 is provided in the handy terminal such as a smartphone carried by a service provider such as a doctor, a nurse, a dentist, a dental hygienist, a rubbing massage finger pressure therapist, a chiropractor, an acupuncturist, a judo-orthopaedist, a health care worker and a physical therapist. The insurance service processing system 200-2A can communicate with the insurance fee claimer server 300 utilized by the medical insurance claimer or the long-term care insurance claimer via the network. The receipt examination institution server 400 and the insurer server 500 are shown in FIG. 7. In the insurance service processing system 200-2A, receipt making application 100-2 and application file 110 are installed. The network system is provided among the above-mentioned components.

The basic operation flow is as follows. When the service provider who is the insurance claimer provides medical operation services or long-term care services to the service beneficiary, the service provider inputs data necessary for making receipts to the corresponding application file 110 via the insurance service processing system 200-2A. The data are sent to the insurance fee claimer server 300 and the correct receipts are made. The receipt data are sent to the insurer server 500 through the receipt examination institution server 400.

The data to be input to the insurance service processing system 200-2A is described.

The service beneficiary (the person who is the receiver of the service) is at home. The service provider such as the judo-orthopaedist visits the service beneficiary's home with the insurance service processing system 200-2A installed in the handy terminal such as a smartphone.

The operation by the insurance service processing system 200-2A in the visiting style case flows the same as that described in Embodiment 4. Each secret code such as select secret code, open secret code, close secret code and deselect secret code is input in each appropriate phase.

(1) Select Secret Code

In this embodiment, a wireless IC tag is installed to the beneficiary home for providing the second service beneficiary ID information associated with the address information.

The second service beneficiary ID information receiver is a wireless IC signal receiver for extracting the second service beneficiary ID information associated with the address information from the received wireless signal.

As shown in FIG. 7 and FIG. 8, the service provider visits the service beneficiary at home and receives the wireless signal in the service beneficiary's home via the second service beneficiary ID information receiver of the insurance service processing system 200-2A. The extracted second service beneficiary ID information is input to the application file select program modules 104 as the "Select secret code".

(2) Open Secret Code

In this embodiment, as shown in FIG. 7 and FIG. 8, the smartphone is equipped with the finger print pattern reader. After application file selecting, an input column for inputting "the open secret code" pops-up, and the service provider inputs his or her finger print pattern via the finger print pattern reader of the smartphone. The input finger print pattern data is converted to the first service provider ID information by the biological pattern information converter 231. The converted first service provider ID information is input to the application file open program module 102 as the "Open secret code".

(3) Close Secret Code

In this embodiment, as shown in FIG. 7 and FIG. 8, after the operation for closing the application file, an input column for inputting "the close secret code" pops-up, and the service provider inputs the service beneficiary's finger print pattern via the finger print pattern reader of the smartphone. The input finger print pattern data is converted to the first service beneficiary ID information by the biological pattern information converter 231. The converted first service beneficiary ID information is input to the application file close program module 103 as the "Close secret code".

(4) Deselect Secret Code

In this embodiment, as shown in FIG. 7 and FIG. 8, when the service provider leaves the service beneficiary home, the service provider receives the wireless signal in the service beneficiary home again via the second service beneficiary ID information receiver of the insurance service processing system 200-2A. The extracted second service beneficiary ID information is input to the application file deselect program module 105 as the "Deselect secret code".

By inputting each secret code in each phase, the operations are executed as shown in Embodiment 4.

Figure 13:
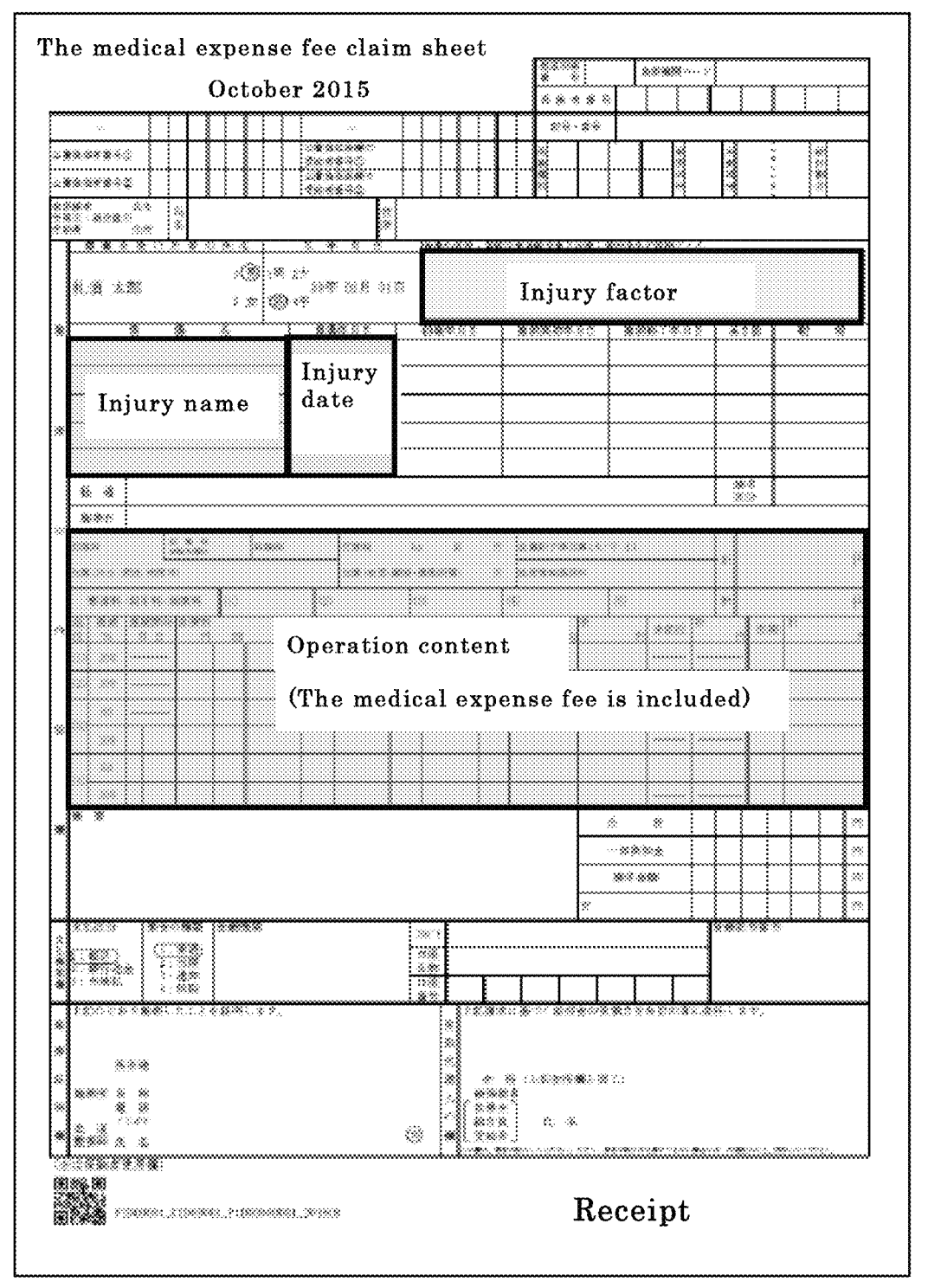
Figure 14:
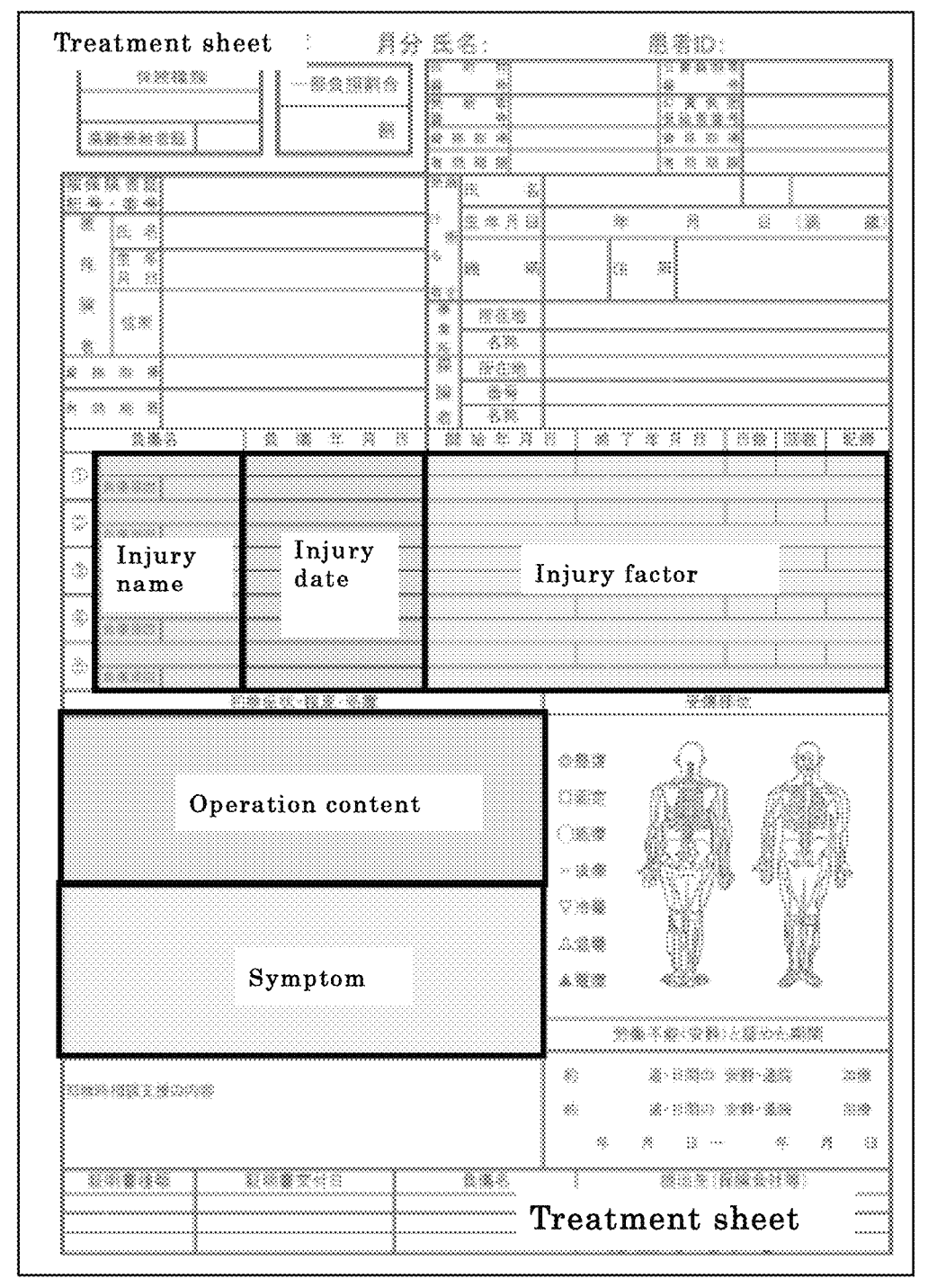

FIG. 13 is a schematic view showing an example of a receipt made by the insurance service processing system 200. FIG. 14 is a schematic view showing an example of a treatment sheet.

In the above-mentioned embodiment, the input device for the second service beneficiary ID information is executed between the wireless IC tag in the service beneficiary's home and the wireless signal receiver carried by the service provider, and the second service beneficiary ID information is sent in the wireless signal via the wireless IC tag. As another example, a combination of a beacon device installed to the beneficiary home for providing the second service beneficiary ID information and beacon receiver installed to the service provider computer can be applicable. As another example, a combination of an ultrasonic wave transmitter installed to the beneficiary home and an ultrasonic wave receiver installed to the service provider computer can be applicable.

Embodiment 6

Embodiment 6 shows an example of the insurance service processing system 200-2B applied as an outpatient visiting assisting system employing the service processing system and the application of the present invention.

Figure 9:
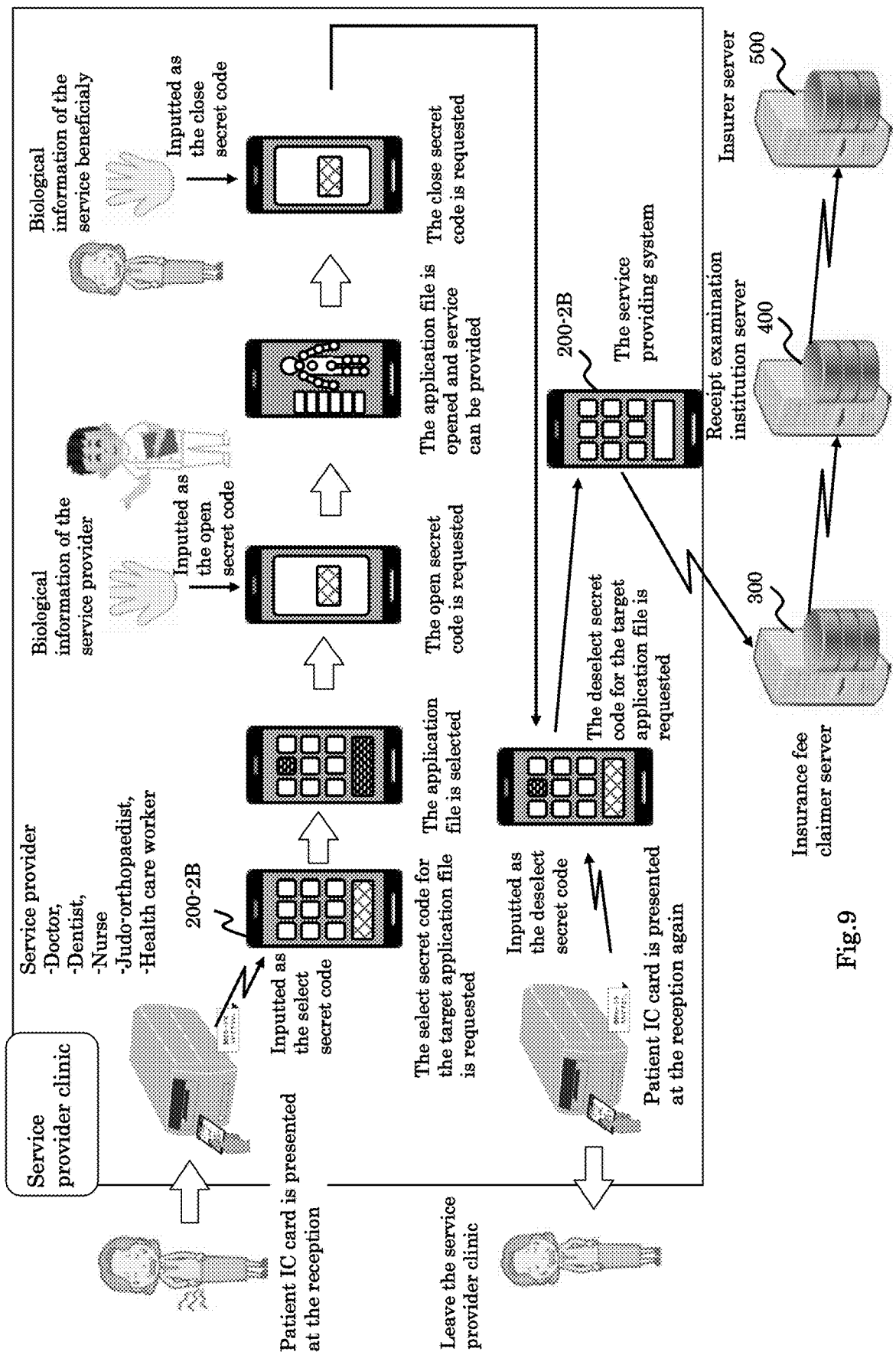
FIG. 9 is a schematic view of the basic operation flow and the basic processes of the insurance service processing system 200-2B as the outpatient visiting assisting system.

FIG. 9 is a schematic view of the basic operation flow and the basic processes of the insurance service processing system 200-2B as the outpatient visiting assisting system.

Figure 10:
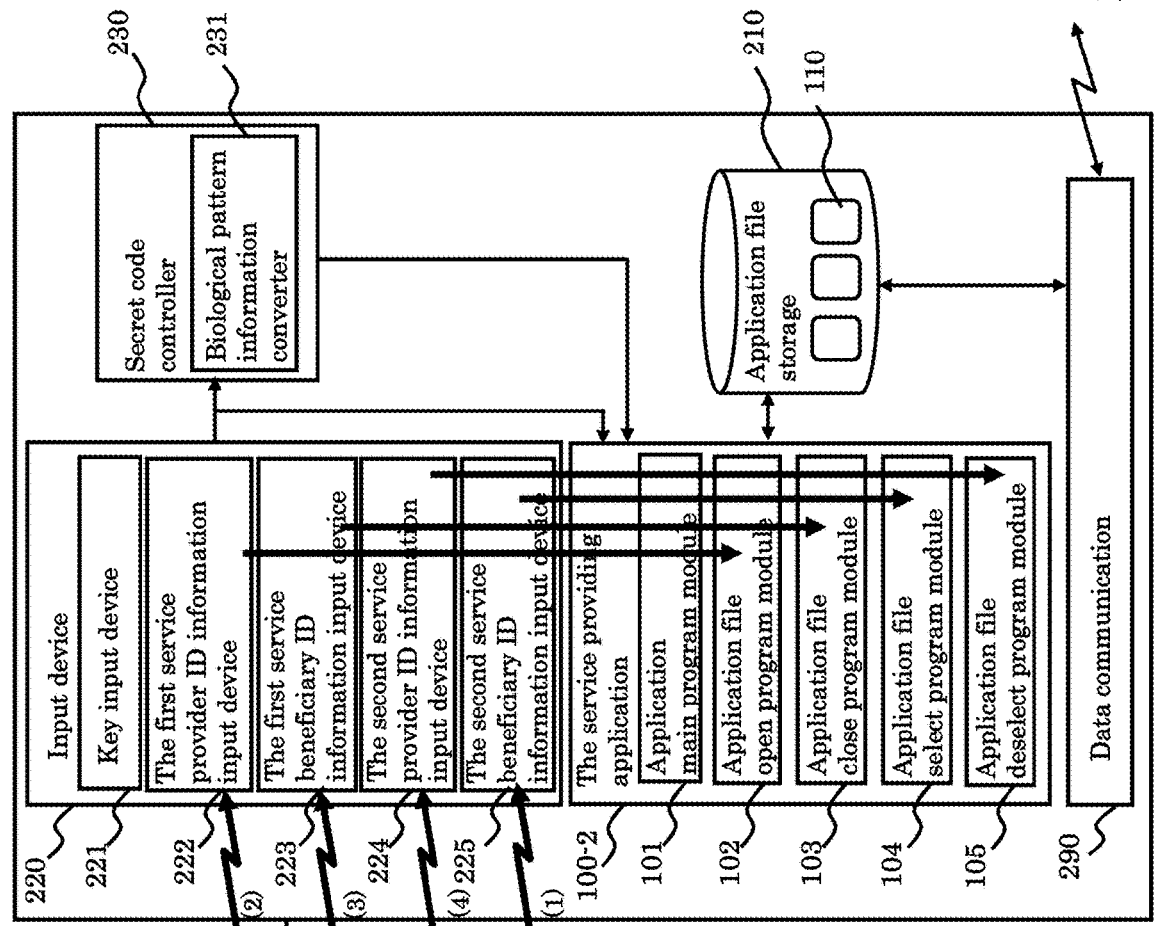
FIG. 10 is a schematic view showing examples of select secret code, open secret code, close secret code and deselect secret code input to the insurance service processing system 200-2B.

FIG. 10 is a schematic view showing examples of select secret code, open secret code, close secret code and deselect secret code input to the insurance service processing system 200-2B.

The insurance service processing system 200-2B as the outpatient visiting assisting system shown in FIG. 9 is provided in the handy terminal such as a smartphone carried by a service provider such as a doctor, a nurse, a dentist, a dental hygienist, a rubbing massage finger pressure therapist, a chiropractor, an acupuncturist, a judo-orthopaedist, a health care worker and a physical therapist. The same as FIG. 7, the insurance service processing system 200-2B can communicate with the insurance fee claimer server 300 utilized by the medical insurance claimer or the long-term care insurance claimer via the network. The receipt examination institution server 400 and the insurer server 500 are shown in FIG. 7.

The data to be input to the insurance service processing system 200-2B is described.

The outpatient visits the service provider such as the judo-orthopaedist. The service provider such as the judo-orthopaedist waits for the outpatient to visit. The judo-orthopaedist holds the insurance service processing system 200-2B installed in the handy terminal such as a smartphone.

The operation by the insurance service processing system 200-2B in the outpatient visiting style case flows the same as that described in Embodiment 4. Each secret code such as select secret code, open secret code, close secret code and deselect secret code is input in each appropriate phase.

(1) Select Secret Code

In this embodiment, as shown in FIG. 9 and FIG. 10, there is a reception terminal at the reception of the judo-orthopaedist clinic. The finger print pattern reader is installed as a separate device of the insurance service processing system 200-2B used as the second service beneficiary ID information input device 225. The finger print pattern reader can communicate with the insurance service processing system 200-2B. As shown above, the second service beneficiary ID information input device is the finger print pattern reader, the judo-orthopaedist inputs the outpatient finger print pattern. The input finger print pattern of the outpatient is converted to the second service beneficiary ID information via the biological pattern information converter 231, and outputs the converted secret code to the application file select program modules 104 as "Select secret code".

(2) Open Secret Code

In this embodiment, as shown in FIG. 9 and FIG. 10, the smartphone is equipped with the finger print pattern reader. After application file selecting, an input column for inputting "the open secret code" pops-up, and the judo-orthopaedist inputs his or her finger print pattern via the finger print pattern reader of the smartphone. The input finger print pattern data is converted to the first service provider ID information by the biological pattern information converter 231. The converted first service provider ID information is input to the application file open program module 102 as the "Open secret code".

(3) Close Secret Code

In this embodiment, as shown in FIG. 9 and FIG. 10, after the operation for closing the application file, an input column for inputting "the close secret code" pops-up. The judo-orthopaedist inputs the outpatient finger print pattern via the finger print pattern reader of the smartphone as the first service beneficiary ID information input device 223. The input finger print pattern data is converted to the first service beneficiary ID information by the biological pattern information converter 231. The converted first service beneficiary ID information is input to the application file close program module 103 as the "Close secret code".

(4) Deselect Secret Code

In this embodiment, as shown in FIG. 9 and FIG. 10, when the judo-orthopaedist finishes the service to the outpatient, an input column for inputting the deselect secret code pops-up. The judo-orthopaedist inputs his or her finger print pattern via the finger print pattern reader of the smartphone as the second provider ID information input device 224. The second service provider ID information is input to the application file deselect program module 105 as the "Deselect secret code".

By inputting each secret code in each phase, the operations are executed as shown in Embodiment 4.

FIG. 13 is a schematic view showing an example of a receipt made by the insurance service processing system 200. FIG. 14 is a schematic view showing an example of a treatment sheet.

Embodiment 7

Embodiment 7 shows an example of the insurance service processing system 200-2C applied as a long-term care outpatient visiting assisting system employing the service processing system and the application of the present invention.

Figure 11:
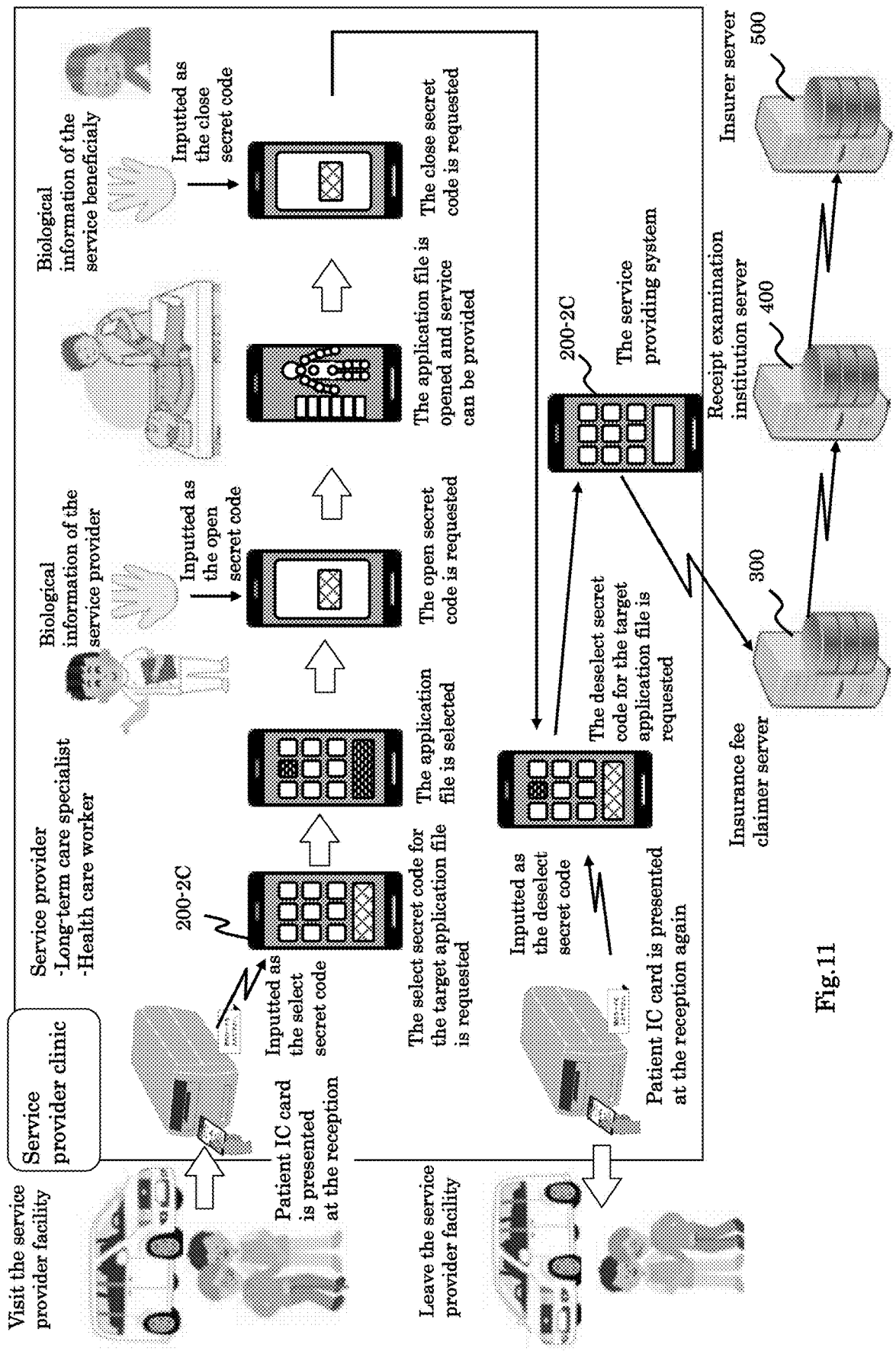
FIG. 11 is a schematic view of the basic operation flow and the basic processes of the insurance service processing system 200-2C as the long-term care outpatient visiting assisting system.

FIG. 11 is a schematic view of the basic operation flow and the basic processes of the insurance service processing system 200-2C as the long-term care outpatient visiting assisting system.

Figure 12:
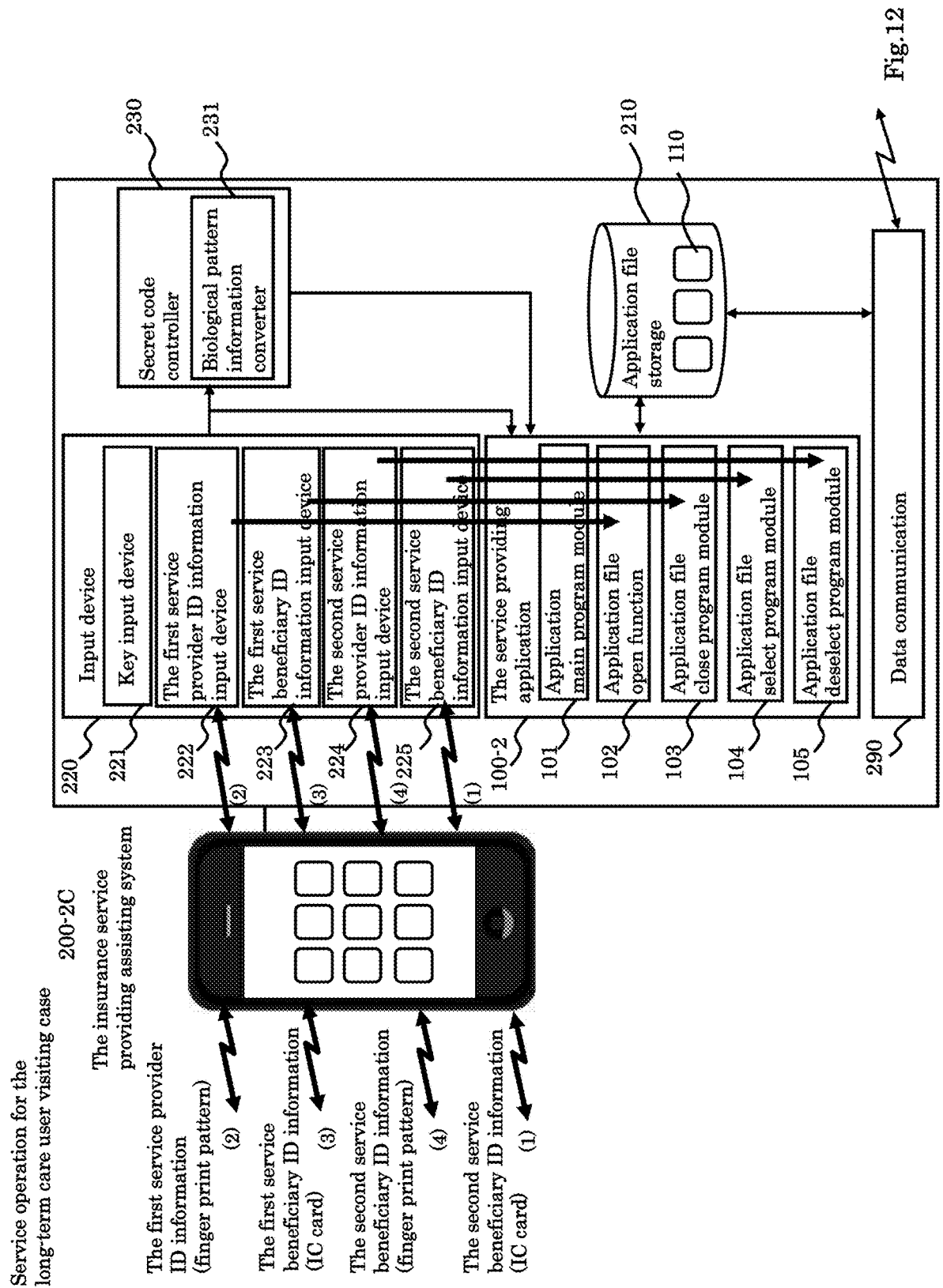
FIG. 12 is a schematic view showing examples of select secret code, open secret code, close secret code and deselect secret code input to the insurance service processing system 200-2C.
Figure 15:
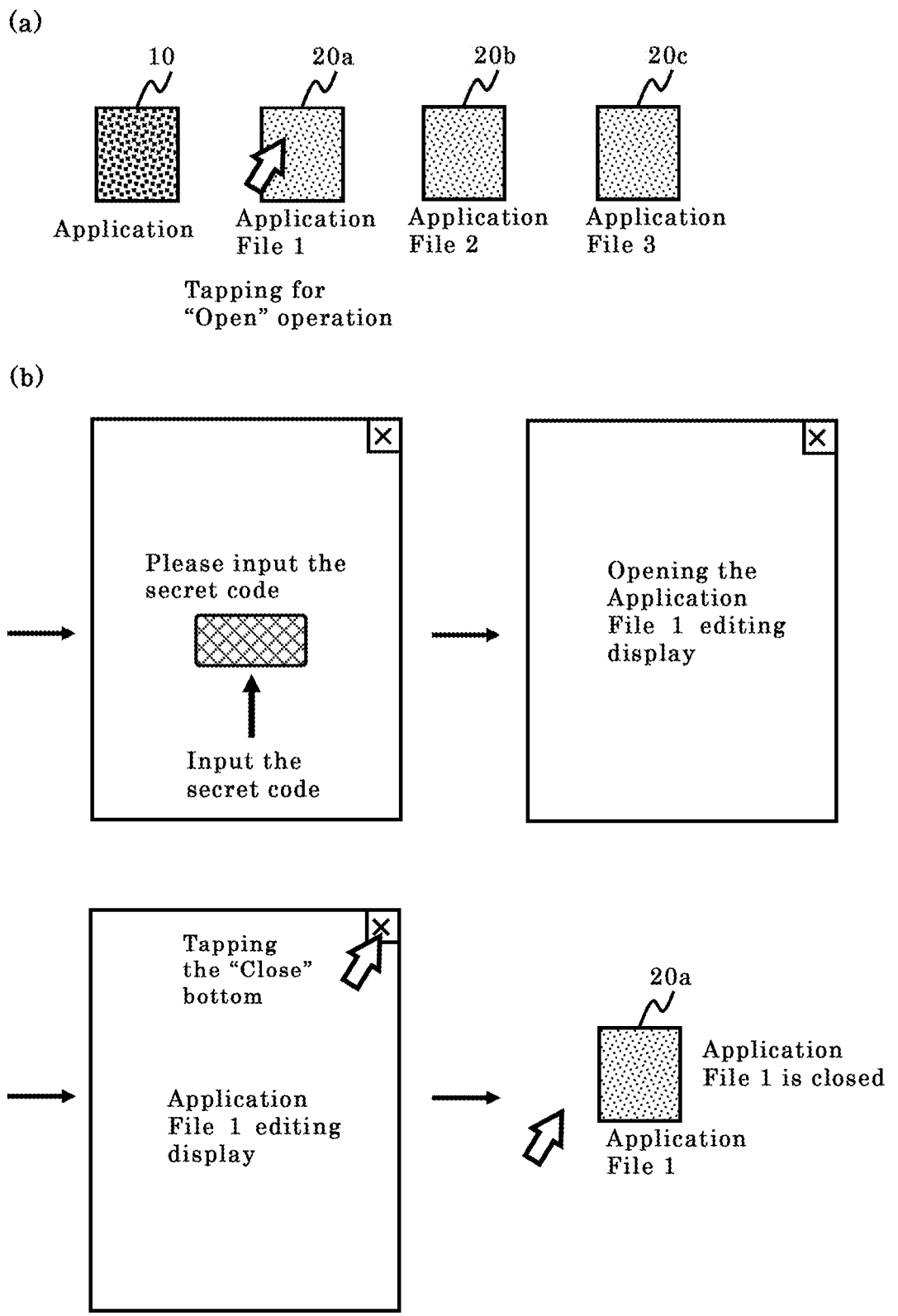
FIG. 15 is a schematic view showing the structure of a conventional application in the prior art.
Figure 16:
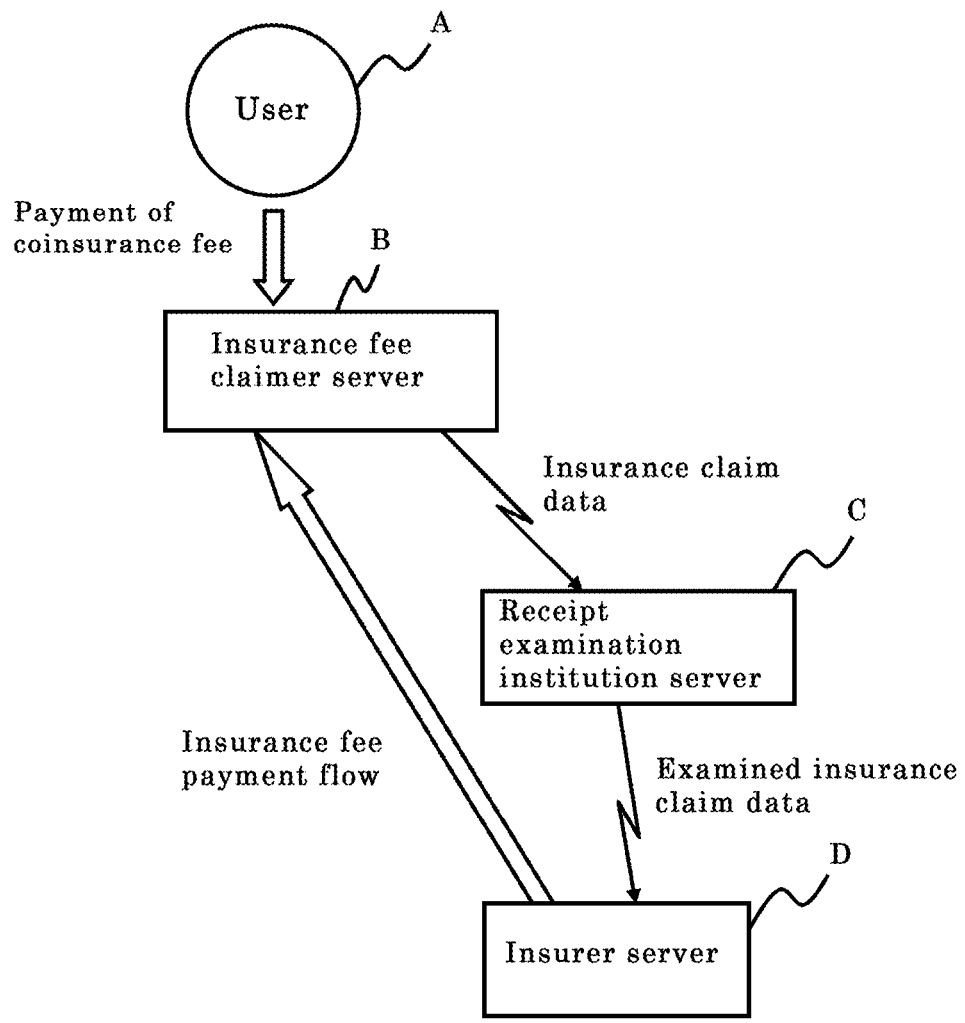
FIG. 16 is a schematic view showing the conventional data flow of the medical expense fee claiming data in case of a rubbing massage finger pressure therapist clinic, a bonesetter clinic and a judo-orthopaedist of the bonesetter clinic.

FIG. 12 is a schematic view showing examples of select secret code, open secret code, close secret code and deselect secret code input to the insurance service processing system 200-2C.

The data to be input to the insurance service processing system 200-2C is described.

The long-term care user who would like to care by the long-term care service visits the long-term care facility. The service provider such as a long-term care specialist waits for the long-term case user. The long-term care specialist holds the insurance service processing system 200-2C installed in the handy terminal such as a smartphone.

The operation by the insurance service processing system 200-2C in the user visiting style case flows the same as that described in Embodiment 4. Each secret code such as select secret code, open secret code, close secret code and deselect secret code is input in each appropriate phase.

(1) Select Secret Code

In this embodiment, as shown in FIG. 11 and FIG. 12, there is a reception terminal at the reception of the long-term care facility. The finger print pattern reader is installed as a separate device of the insurance service processing system 200-2C used as the second service beneficiary ID information input device 225. The finger print pattern reader can communicate with the insurance service processing system 200-2C. As shown above, the second service beneficiary ID information input device is the finger print pattern reader, the long-term care specialist inputs the long-term care user's finger print pattern. The input finger print pattern of the long-term care user is converted to the second service beneficiary ID information via the biological pattern information converter 231, and the converted secret code is output to the application file select program modules 104 as "Select secret code".

(2) Open Secret Code

In this embodiment, as shown in FIG. 11 and FIG. 12, the smartphone is equipped with the finger print pattern reader. After application file selecting, an input column for inputting "the open secret code" pops-up, the long-term care specialist inputs his or her finger print pattern via the finger print pattern reader of the smartphone. The input finger print pattern data is converted to the first service provider ID information by the biological pattern information converter 231. The converted first service provider ID information is input to the application file open program module 102 as the "Open secret code".

(3) Close Secret Code

In this embodiment, as shown in FIG. 11 and FIG. 12, after the operation for closing the application file, an input column for inputting "the close secret code" pops-up. The long-term care specialist inputs the long-term care user's finger print pattern via the finger print pattern reader of the smartphone as the first service beneficiary ID information input device 223. The input finger print pattern data is converted to the first service beneficiary ID information by the biological pattern information converter 231. The converted first service beneficiary ID information is input to the application file close program module 103 as the "Close secret code".

(4) Deselect Secret Code

In this embodiment, as shown in FIG. 11 and FIG. 12, when the long-term care specialist finishes the service to the long-term care user, an input column for inputting "the deselect secret code" pops-up. The long-term care specialist inputs the his or her finger print pattern via the finger print pattern reader of the smartphone as the second provider ID information input device 224. The second service provider ID information is input to the application file deselect program module 105 as the "Deselect secret code".

By inputting each secret code in each phase, the operations are executed as shown in Embodiment 4.

FIG. 13 is a schematic view showing an example of a receipt made by the insurance service processing system 200. FIG. 14 is a schematic view showing an example of a treatment sheet.

In the above description of Embodiment 5, 6 and 7, the first service beneficiary ID information input device is described as the finger print pattern reader, but another configuration comprising a display for displaying the service contents served to the service beneficiary and an approval device that inputs and controls the service beneficiary approval that the service contents displayed on the display are correct can be used. In this another configuration, the service beneficiary can input the approval information and the approval information and this can be regarded as the first service beneficiary ID information.

INDUSTRIAL APPLICABILITY

This invention relates to the application operated on the computer system and the service processing system. There are various service processing system employing the present application. The use of the application and the service processing system is not limited.

While some preferable embodiments of the sample storage according to the present invention are described above, it should be understood that various changes are possible, without deviating from the technical scope according to the present invention. Therefore, the technical scope according to the present invention is limited only by the claims attached.

The invention claimed is:

1. An insurance service processing system comprising a non-transitory computer readable storage medium having computer program instructions stored thereon for operating an application file stored in an application file storage, the computer program instructions being executed by a processor to execute following steps:
   an application file open program module performing authentication between an input open code via an input device and an open secret code recorded in the application file, and opening the application file under the condition that the input open code is matched with the open secret code;
   an application main program module operating the application file;
   an application file close program module performing authentication between an input close code via an input device and a close secret code recorded in the application file, and closing the application file under the condition that the input close code is matched with the close secret code so that operating the application file is verified;
   wherein prior to closing the application file, the application file close program module verifies a correctness of edited data in the application file with actual service content provided by a service provider after inputting the close secret code;
   wherein the application file records the open secret code for opening each application file by an application and the close secret code for closing each application file normally by the application,
   wherein a computer system is an insurance service processing assisting system for assisting services covered by the medical service insurance or covered by the long-term insurance between a service provider and a service beneficiary regardless of which person is a visitor and which person is a person visited by the visitor, and the computer system includes a service provider computer carried by the service provider,
   wherein the application is a service providing assisting application for services covered by the medical service insurance or covered by the long-term insurance, and the application is installed to the service provider computer,
   wherein the computer system is an insurance service processing assisting system for assisting services covered by the medical service insurance or covered by the long-term insurance between a service provider and a service beneficiary regardless of which person is a visitor and which person is a person visited by the visitor, and the computer system includes a service provider computer carried by the service provider,
   wherein matching process of the input open code with the open secret code is carried out independently from the close secret code, and matching process of the input close code with the close secret code is carried out independently from the open secret code.

2. The insurance service processing system according to claim 1, further comprising,
   a first service provider ID information input device for receiving a first service provider ID information for identifying the service provider,
   a first service beneficiary ID information input device for receiving a first service beneficiary ID information for identifying the service beneficiary,
   a secret code controller that controls the first service provider ID information used as the open secret code for the application file open program module, and the first service beneficiary ID information used as the close secret code for the application file close program module.

3. The insurance service processing system according to claim 1,
   wherein the application file includes a select secret code for selecting an application file among the application files that are available by a computer system and a deselect secret code for deselecting the application file that is closed normally by the application file close program module,
   the steps further comprising,
   an application file select program module selecting the application file under the condition that an input code via an input device is matched with the select secret code;
   an application file deselect program module detecting the application file which is closed normally by the application file close program module under the condition that an input code via an input device is matched with the deselect secret code,
   wherein the computer system is an insurance service processing assisting system for assisting services covered by the medical service insurance or covered by the long-term insurance between a service provider and a service beneficiary regardless of which person is a visitor and which person is a person visited by the visitor, and the computer system includes a service provider computer carried by the service provider.

4. The insurance service processing system according to claim 3, further comprises,
a first service provider ID information input device for receiving a first service provider ID information for identifying the service provider,
a first service beneficiary ID information input device for receiving a first service beneficiary ID information for identifying the service beneficiary,
a second service beneficiary ID information input device that sends a second service beneficiary ID information associated with the personal information of the service beneficiary or the address information of the service beneficiary to the service provider computer, and the holder of the second service beneficiary ID information input device is the service beneficiary;
a secret code controller that controls that
the former input of the second service beneficiary ID information is used as the select secret code to the application file select program module,
the first service provider ID information is used as the open secret code to the application file open program module,
the first service beneficiary ID information is used as the close secret code to the application file close program module, and
the latter input of the second service beneficiary ID information is used as the deselect secret code to the application file deselect program module.

5. The insurance service processing system according to claim 2,
wherein the first service provider ID information is the biological information of the service provider, and the first service provider ID information input device is a biological information input device installed to the service provider computer for reading the biological information from the service provider,
wherein the first service beneficiary ID information is the biological information of the service beneficiary, and the first service beneficiary ID information input device is a biological information input device installed to the service provider computer for reading the biological information from the service beneficiary.

6. The insurance service processing system according to claim 4,
wherein the visitor is the service provider and the person visited by the visitor is the service beneficiary, and the insurance service processing system is a service provider visiting assisting system,
wherein the second service beneficiary ID information is the address information of the service beneficiary, and the second service beneficiary ID information input device comprises a beacon device installed to the beneficiary home for providing the address information and a beacon receiver installed to the service provider computer,
wherein the first service provider ID information is the biological information of the service provider, and the first service provider ID information input device is a biological information input device installed to the service provider computer for reading the biological information from the service provider,
wherein the first service beneficiary ID information is the biological information of the service beneficiary, and the first service beneficiary ID information input device is a biological information input device installed to the service provider computer for reading the biological information from the service beneficiary.

7. The insurance service processing system according to claim 4,
wherein the visitor is the service provider and the person visited by the visitor is the service beneficiary, and the insurance service processing system is a service provider visiting assisting system,
wherein the second service beneficiary ID information is the address information of the service beneficiary, and the second service beneficiary ID information input device comprises a beacon device installed to the beneficiary home for providing the address information and a beacon receiver installed to the service provider computer,
wherein the first service provider ID information is the information recorded in a service provider IC card carried by the service provider, and the first service provider ID information input device is an IC card input device installed to the service provider computer for reading the information from the service provider IC card,
wherein the first service beneficiary ID information is the biological information of the service beneficiary, and the first service beneficiary ID information input device is a biological information input device installed to the service provider computer for reading the biological information from the service beneficiary.

8. The insurance service processing system according to claim 2,
wherein the visitor is the service provider and the person visited by the visitor is the service beneficiary, and the insurance service processing system is a service provider visiting assisting system,
wherein the second service beneficiary ID information is the GPS information of the service beneficiary home, and the second service beneficiary ID information input device comprises a receiver of the GPS information from GPS system installed to the service provider computer,
wherein the first service provider ID information is the biological information of the service provider, and the first service provider ID information input device is a biological information input device installed to the service provider computer for reading the biological information from the service provider,
wherein the first service beneficiary ID information is the biological information of the service beneficiary, and the first service beneficiary ID information input device is a biological information input device installed to the service provider computer for reading the biological information from the service beneficiary.

9. The insurance service processing system according to claim 2,
wherein the visitor is the service provider and the person visited by the visitor is the service beneficiary, and the insurance service processing system is a service provider visiting assisting system,
wherein the second service beneficiary ID information is the GPS information of the service beneficiary home, and the second service beneficiary ID information input device comprises a receiver of the GPS information from GPS system installed to the service provider computer, wherein the first service provider ID information is the information recorded in a service provider IC card carried by the service provider, and the first service provider ID information input device is an IC card input device installed to the service provider computer for reading the information from the service provider IC card, wherein the first service beneficiary ID information is the biological information of the service beneficiary, and the first service beneficiary ID information input device is a biological information input device installed to the service provider computer for reading the biological information from the service beneficiary.

10. The insurance service processing system according to claim 4, wherein the visitor is the service beneficiary and the person visited by the visitor is the service provider, and the insurance service processing system is an outpatient visiting assisting system, wherein the second service beneficiary ID information is the information recorded in a service beneficiary IC card carried by the service beneficiary, and the second service beneficiary ID information input device is an IC card input device installed to the service provider computer for reading the information from the service beneficiary IC card, wherein the first service provider ID information is the information recorded in a service provider IC card carried by the service provider, and the first service provider ID information input device is an IC card input device installed to the service provider computer for reading the information from the service provider IC card, wherein the first service beneficiary ID information is the biological information of the service beneficiary, and the first service beneficiary ID information input device is a biological information input device installed to the service provider computer for reading the biological information from the service beneficiary.

11. The insurance service processing system according to claim 4, wherein the visitor is the service beneficiary and the person visited by the visitor is the service provider, and the insurance service processing system is an outpatient visiting assisting system, wherein the second service beneficiary ID information is the information recorded in a service beneficiary IC card carried by the service beneficiary, and the second service beneficiary ID information input device is an IC card input device installed to the service provider computer for reading the information from the service beneficiary IC card, wherein the first service provider ID information is the biological information of the service provider, and the first service provider ID information input device is a biological information input device installed to the service provider computer for reading the biological information from the service provider, wherein the first service beneficiary ID information is the biological information of the service beneficiary, and the first service beneficiary ID information input device is a biological information input device installed to the service provider computer for reading the biological information from the service beneficiary.

12. The insurance service processing system according to claim 2, wherein the first service beneficiary ID information input device comprises, a display for displaying the provided service content to the service beneficiary, an approval input device that inputs the approval information from the service beneficiary for approving the provided service content displayed on the display is correct, wherein the approval information from the service beneficiary input by the approval input device is treated as the first service beneficiary ID information.

\* \* \* \* \*